(12) United States Patent
 Cheng

(10) Patent No.: US 11,432,677 B2
(45) Date of Patent: Sep. 6, 2022

(54) MODULAR COFFEE GRINDER SYSTEM

(71) Applicant: MISAINE TRADE, INC., Torrance, CA (US)

(72) Inventor: Benjamin Cheng, Rolling Hills, CA (US)

(73) Assignee: MISAINE TRADE, INC., Torrance, CA (US)

( * ) Notice: Subject to any disclaimer, the term of this patent is extended or adjusted under 35 U.S.C. 154(b) by 829 days.

(21) Appl. No.: 16/270,543

(22) Filed: Feb. 7, 2019

(65) Prior Publication Data

US 2020/0054162 A1 Feb. 20, 2020

Related U.S. Application Data

(63) Continuation-in-part of application No. 29/660,027, filed on Aug. 14, 2018, now Pat. No. Des. 876,883.
(Continued)

(51) Int. Cl.
| | |
|---|---|
| *A47J 42/04* | (2006.01) |
| *A47J 31/42* | (2006.01) |
| *A47J 42/24* | (2006.01) |
| *A47J 42/50* | (2006.01) |
| *A47J 42/46* | (2006.01) |
| *A47J 42/34* | (2006.01) |

(Continued)

(52) U.S. Cl.
CPC ............... *A47J 31/42* (2013.01); *A47J 42/04* (2013.01); *A47J 42/24* (2013.01); *A47J 42/34* (2013.01); *A47J 42/46* (2013.01); *A47J 42/50* (2013.01); *A47J 42/06* (2013.01); *A47J 42/36* (2013.01); *A47J 2201/00* (2013.01)

(58) Field of Classification Search
CPC .. A47J 42/04; A47J 42/06; A47J 42/34; A47J 42/36; A47J 42/40; A47J 42/46; A47J 42/48
USPC ....................................... 99/169.1; 241/169.1
See application file for complete search history.

(56) References Cited

U.S. PATENT DOCUMENTS

| | | | |
|---|---|---|---|
| 43,374 A | 6/1864 | Whitmer | |
| 455,818 A | 7/1891 | Mader et al. | |
| (Continued) | | | |

FOREIGN PATENT DOCUMENTS

| | | | | |
|---|---|---|---|---|
| DE | 1002489 | * | 8/1965 | .............. A47J 42/04 |
| DE | 29603113 | * | 6/1996 | .............. A47J 42/04 |
| DE | 202011002689 | * | 6/2011 | .............. A47J 42/40 |

*Primary Examiner* — Reginald Alexander
(74) *Attorney, Agent, or Firm* — Knobbe Martens Olson & Bear LLP

(57) ABSTRACT

A grinding kit includes a grinding unit having a body defining an inner cavity, the body having a receiving end a depositing end. The grinding unit includes a plurality of grinding surfaces disposed within the inner cavity of the body and a drive shaft coupled to the one or more grinding surfaces. The grinding kit includes a first handle configured to removably couple to the drive shaft and configured to rotate about a first axis of rotation while coupled to the drive shaft to drive movement of the plurality of grinding surfaces. The grinding kit includes a second handle configured to removably couple to the drive shaft and configured to rotate about a second axis of rotation while coupled to the drive shaft to drive movement of the plurality of driving surfaces, the second axis of rotation being different from the first axis of rotation.

20 Claims, 22 Drawing Sheets

Related U.S. Application Data and a continuation-in-part of application No. 29/660,028, filed on Aug. 14, 2018, now Pat. No. Des. 896,565.

(51) Int. Cl.
*A47J 42/06* (2006.01)
*A47J 42/36* (2006.01)

(56) References Cited

U.S. PATENT DOCUMENTS

| | | | |
|---|---|---|---|
| 578,560 | A | 3/1897 | Griswold |
| D107,010 | S | 11/1937 | Fegley et al. |
| 2,627,377 | A | 2/1953 | Fletcher |
| 2,671,617 | A | 3/1954 | Talge |
| 3,552,460 | A | 1/1971 | Cooney |
| 4,135,672 | A | 1/1979 | Schlessel |
| D269,489 | S | 6/1983 | Akita |
| 4,588,136 | A | 5/1986 | Homma |
| 4,771,955 | A * | 9/1988 | Paulson ............ A47J 42/04 241/169.1 |
| D328,552 | S | 8/1992 | Lee |
| D337,239 | S | 7/1993 | Lin |
| D364,531 | S | 11/1995 | Berner et al. |
| 5,513,810 | A | 5/1996 | Lin |
| 5,626,299 | A * | 5/1997 | Haynes ............ A47J 42/04 241/169.1 |
| 5,651,506 | A | 7/1997 | Hockey |
| D385,148 | S | 10/1997 | Ikenaga |
| 5,722,606 | A | 3/1998 | Wu |
| D426,420 | S | 6/2000 | Lin |
| D434,270 | S | 11/2000 | Lin |
| D486,702 | S | 2/2004 | Sorensen |
| D496,824 | S | 10/2004 | Meshes |
| D530,993 | S | 10/2006 | Kolflat |
| 7,204,440 | B2 | 4/2007 | Fouse et al. |
| D609,535 | S | 2/2010 | Kavanaugh |
| D671,787 | S | 12/2012 | Lin |
| D700,006 | S | 2/2014 | Braune et al. |
| D700,007 | S | 2/2014 | Braune et al. |
| D787,280 | S | 5/2017 | Moreau |
| D830,138 | S | 10/2018 | Zhang |
| D839,659 | S | 2/2019 | Cometti |
| 2005/0035233 | A1 | 2/2005 | Fredericks |
| 2009/0095832 | A1 | 4/2009 | Wu |
| 2013/0193246 | A1 | 8/2013 | Roberts, Jr. |
| 2016/0135646 | A1 | 5/2016 | Cacciamani et al. |
| 2016/0227959 | A1 | 8/2016 | Yoon |
| 2017/0231419 | A1 | 8/2017 | Chen |
| 2017/0319009 | A1 | 11/2017 | Seckel et al. |

* cited by examiner

MODULAR COFFEE GRINDER SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present application relates to home appliances, and more particularly to methods, systems, and apparatuses for grinding a material.

Description

Traditionally, the process of brewing coffee includes flowing water through ground coffee beans and a coffee filter. Coffee beans can be purchased in the form of ground beans or as whole coffee beans. Whole coffee beans can be ground prior to brewing coffee by restaurants or cafés using a coffee bean grinder. Coffee bean grinders are also available for home use by individual consumers. Traditional mechanisms for grinding beans include blade grinders and burr grinders. Blade grinders include rotating blades that cut or chop beans introduced into the grinder. Burr grinders break apart coffee beans through rotation of toothed surfaces against one another.

SUMMARY

Methods, systems, and apparatuses for grinding a material are provided in embodiments of the present application.

In some embodiments, a grinding kit is provided. The grinding kit can include a grinding unit, a first handle, and a second handle. The grinding unit can include a body defining an inner cavity, a plurality of grinding surfaces disposed within the inner cavity of the body, and a drive shaft coupled to the one or more grinding surfaces. The body can include a receiving end and a depositing end. The first handle can be configured to removably couple to the drive shaft. The first handle can be also configured to rotate about a first axis of rotation while coupled to the drive shaft to drive movement of the plurality of grinding surfaces. The second handle can be configured to removably couple to the drive shaft. The second handle can be also configured to rotate about a second axis of rotation while coupled to the drive shaft to drive movement of the plurality of driving surfaces, the second axis of rotation being different from the first axis of rotation.

In other embodiments, a portable grinding system is provided. The portable grinding system can include a grinding unit, a receptacle, and a first handle. The grinding unit can include a body defining an inner cavity, a plurality of grinding surfaces disposed within the inner cavity of the body, and a drive shaft coupled to the one or more grinding surfaces. The body can include a receiving end and a depositing end. The receptacle can include a proximal end coupled to the depositing end of the body of the grinding unit, a closed distal end, and an inner cavity extending between the proximal end and the closed distal end. The proximal end can include an opening positioned to receive a ground product from the grinding unit. The first handle can be removably secured to the receiving end of the grinding unit. The first handle can include a transmission coupled to the drive shaft of the grinding unit and a handle arm coupled to the transmission and configured to rotate to drive movement of the plurality of grinding surfaces. The grinding unit can be removable from the receptacle and handle body and configured to couple to a frame and a second handle to form a table-top grinding system.

In other embodiments, a table-top grinding system is provided. The table-top grinding system can include a grinding unit, a frame, and a first handle. The grinding unit can include a body defining an inner cavity, a plurality of grinding surfaces disposed within the inner cavity of the body, and a drive shaft coupled to the one or more grinding surfaces. The body can include a receiving end and a depositing end. The frame can include a base, a plurality of struts extending superiorly from the base, and a cradle extending between the plurality of struts and configured to secure the grinding unit. The first handle can be removably secured to the receiving end of the grinding unit. The handle can include a transmission coupled to the drive shaft of the grinding unit and a handle arm coupled to the transmission and configured to rotate to drive movement of the plurality of grinding surfaces. The grinding unit can be removable from the handle body and configured to couple to a receptacle and a second handle to form a portable grinding system.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

DETAILED DESCRIPTION

Figure 1A:
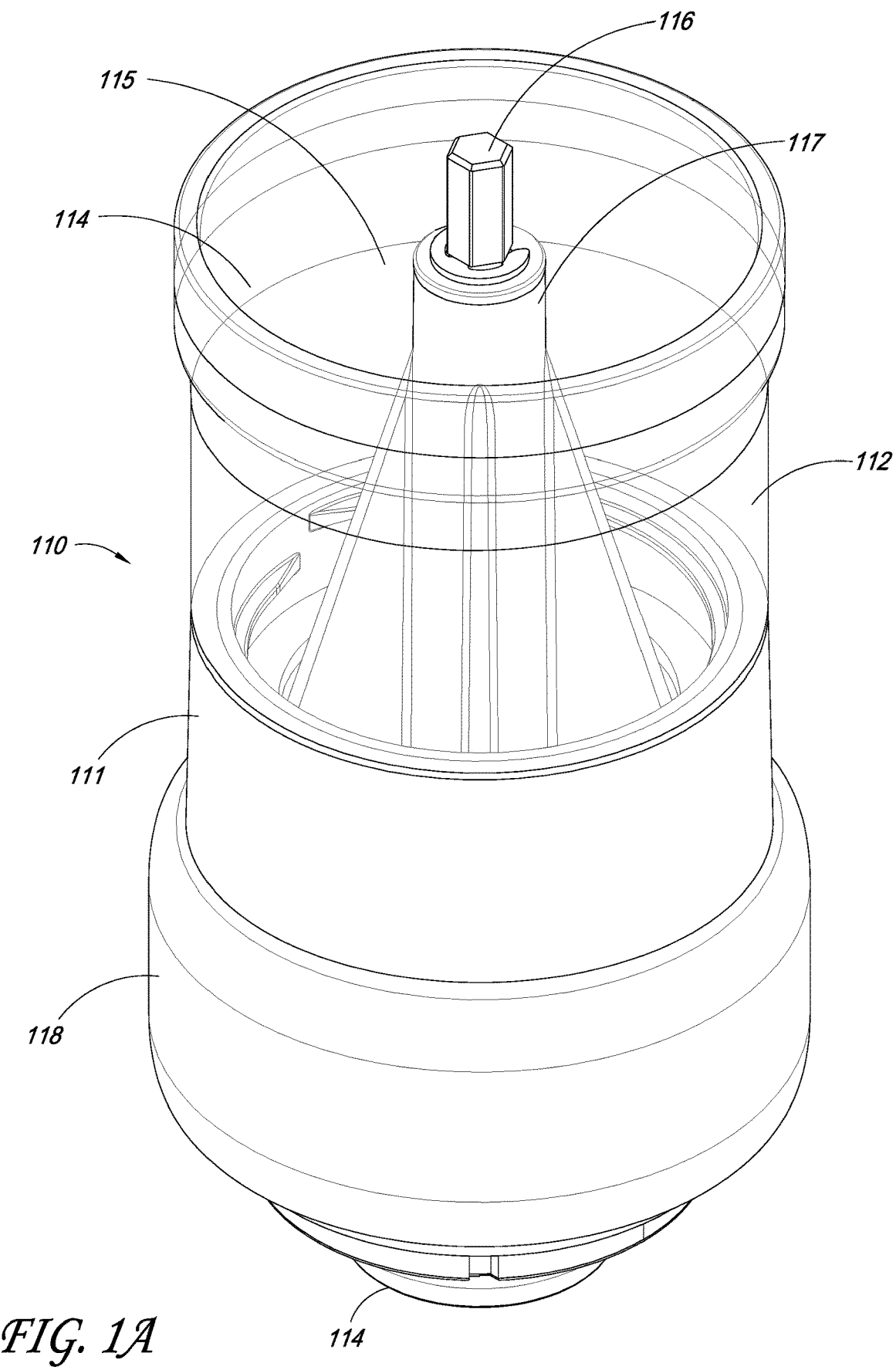
FIG. 1A is a perspective view of an embodiment of a grinding unit.

The following detailed description is directed to certain specific embodiments. The modular coffee grinder disclosed herein, however, can be embodied in a multitude of different ways as defined and covered by the claims. In this description, reference is made to the drawings, wherein like parts are designated with like numerals throughout. The features, aspects and advantages of the modular coffee grinder will now be described with reference to the drawings of several embodiments that are intended to be within the scope of the development herein disclosed. These and other embodiments will become readily apparent to those skilled in the art from the following detailed description of the embodiments having reference to the attached figures, the modular coffee grinder not being limited to any particular embodiment(s) herein disclosed.

FIGS. 1A-4 illustrate different components and configurations of a modular grinder system capable of assembly in a plurality of different grinder configurations. In some embodiments, the modular grinder system can be assembled in a table-top configuration. In some embodiments, the modular grinder system can be assembled in a portable configuration. In some embodiments, the modular grinder system can be assembled in both a table-top configuration and a portable configuration. In some embodiments, the modular grinder system can be transitioned between the table-top configuration and the portable configuration. In some embodiments, one or more components of the modular grinder system used in a first grinder configuration can be used in a second grinder configuration. For example, one or more components of the modular grinder system used in a table-top configuration can be used in a portable configuration. Additionally, one or more components of the modular grinder system used in the portable configuration can be used in the table-top configuration. Due to its modular design, the modular coffee grinder can also be constructed in configurations different from both the portable configuration and the table-top configuration. In some embodiments, the modular coffee grinder can comprise components, which are not specific to a particular configuration. The modular design provides users with a coffee grinder which can be used in different configurations to better suit the user's particular desires at the time of use and/or storage.

In some embodiments, the grinder system can include a grinding unit that can be used in a first grinder configuration and a second grinder configuration. In some embodiments, the grinding unit can be a blade grinding unit. In some embodiments, a blade grinding unit can include one or more rotating blades that can cut or chop an input material into a finer product.

In some embodiments, the grinding unit can be a burr grinding unit. In some embodiments, a burr grinding unit can operate by rotating a first grinding surface against a second grinding surface. In some embodiments, a burr grinding unit can use teeth to break apart an input material. In some embodiments, a burr grinding unit can produce particles of a uniform size. In some embodiments, the size of the particles produced by the blade grinding unit can be determined by the separation between the grinding surfaces. In some embodiments, a burr grinding unit can facilitate control of the size of particles produced by adjustment of the separation distance between the grinding surfaces.

Figure 1B:
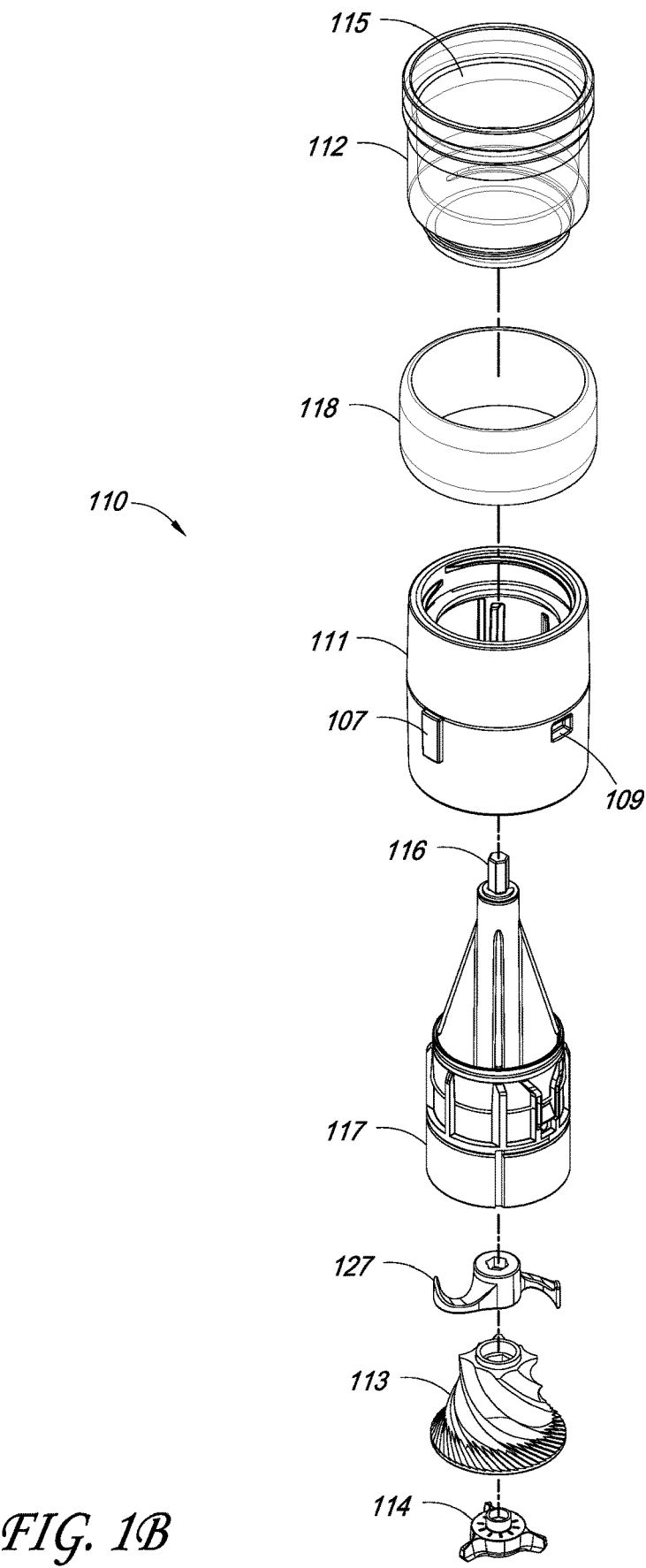
FIG. 1B is an exploded perspective view of the grinding unit of FIG. 1A.
Figure 1C:
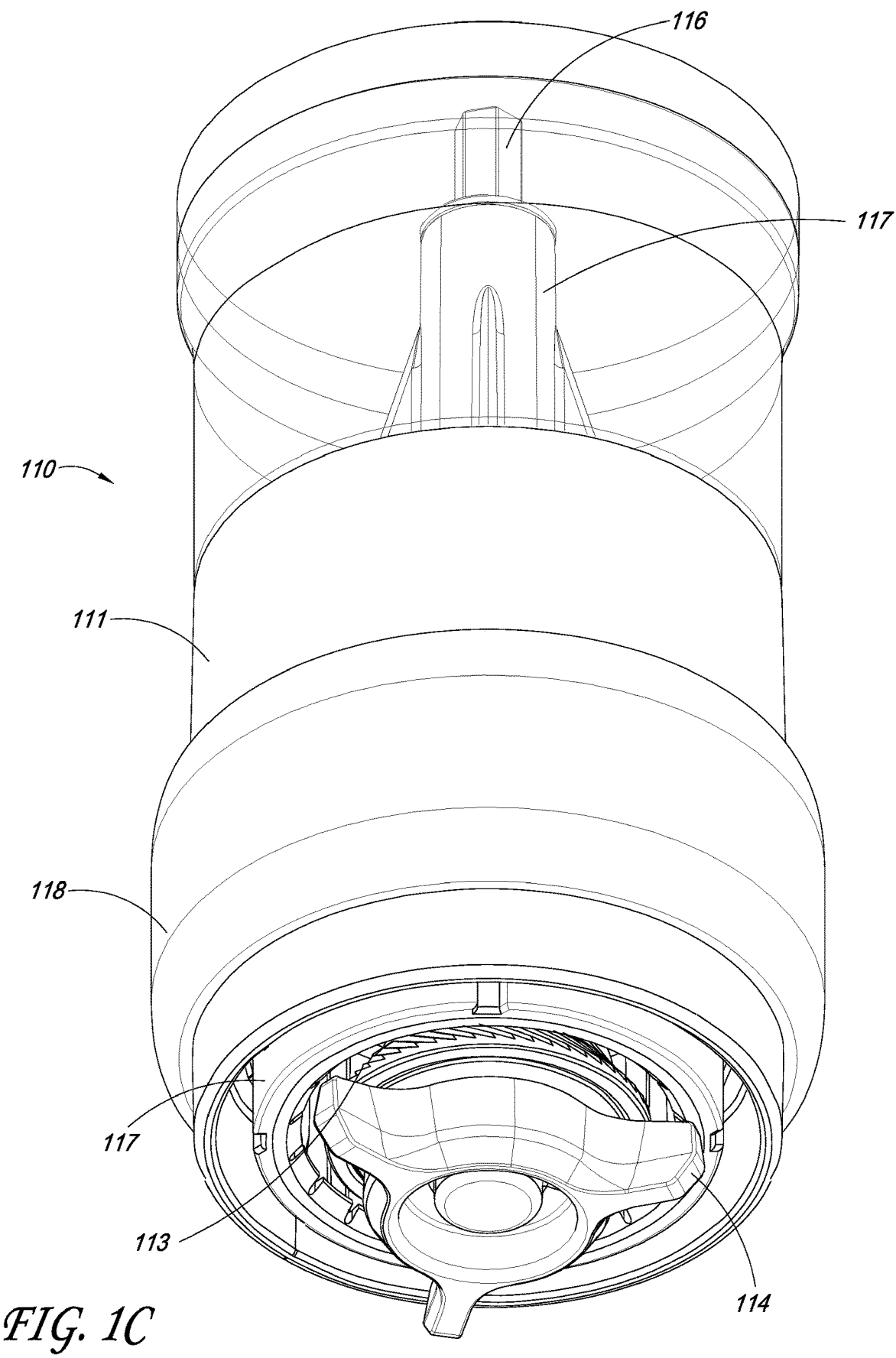
FIG. 1C is a bottom perspective view of the grinding unit of FIG. 1A.
Figure 1D:
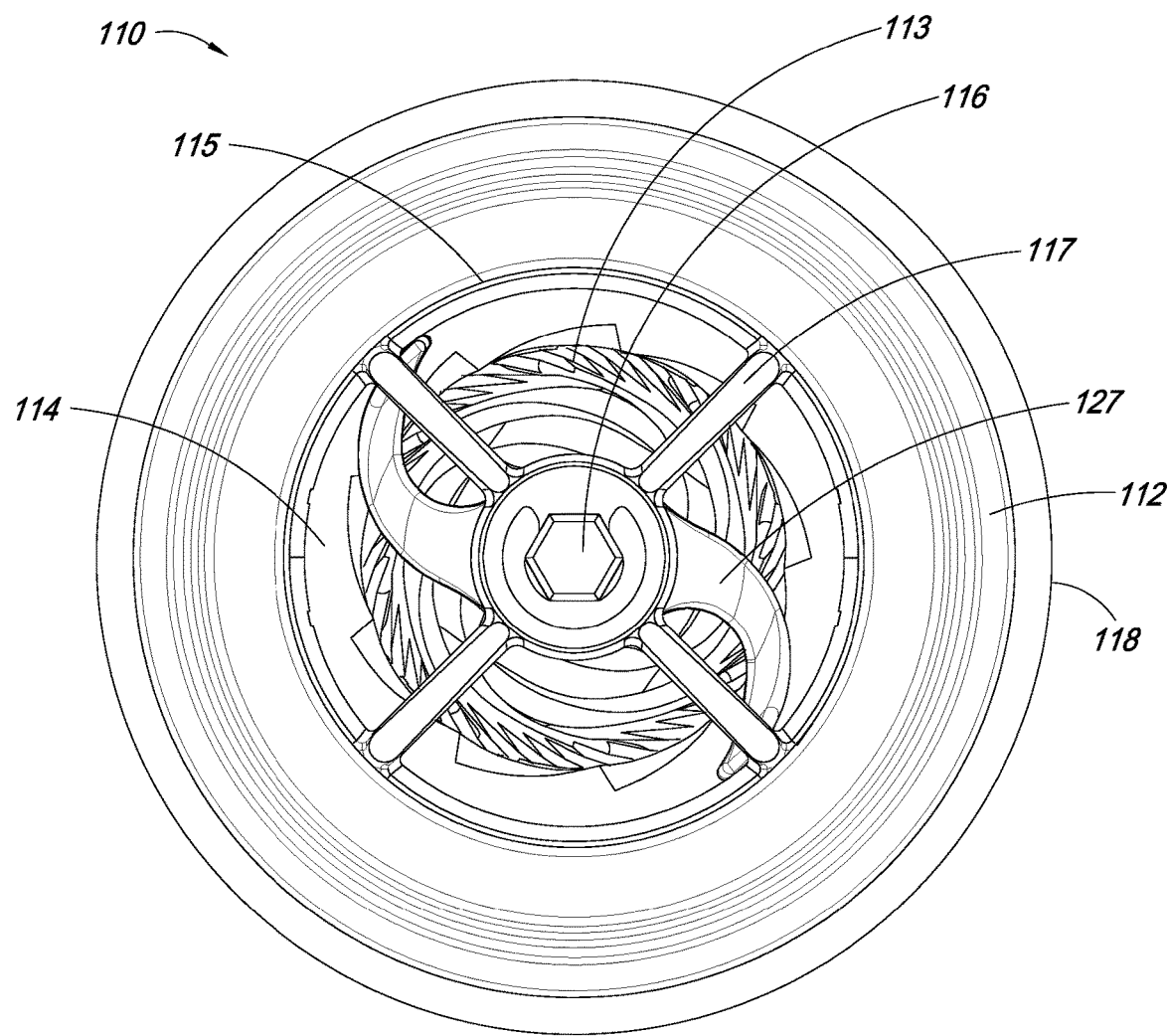
FIG. 1D is a top view of the grinding unit of FIG. 1A.

FIG. 1A depicts a perspective view of an embodiment of a grinding unit 110. FIG. 1B depicts an exploded view of the grinding unit 110. FIG. 1C depicts a bottom perspective view of the grinding unit 110. FIG. 1D depicts a top view of the grinding unit of FIG. 110.

Figure 2A:
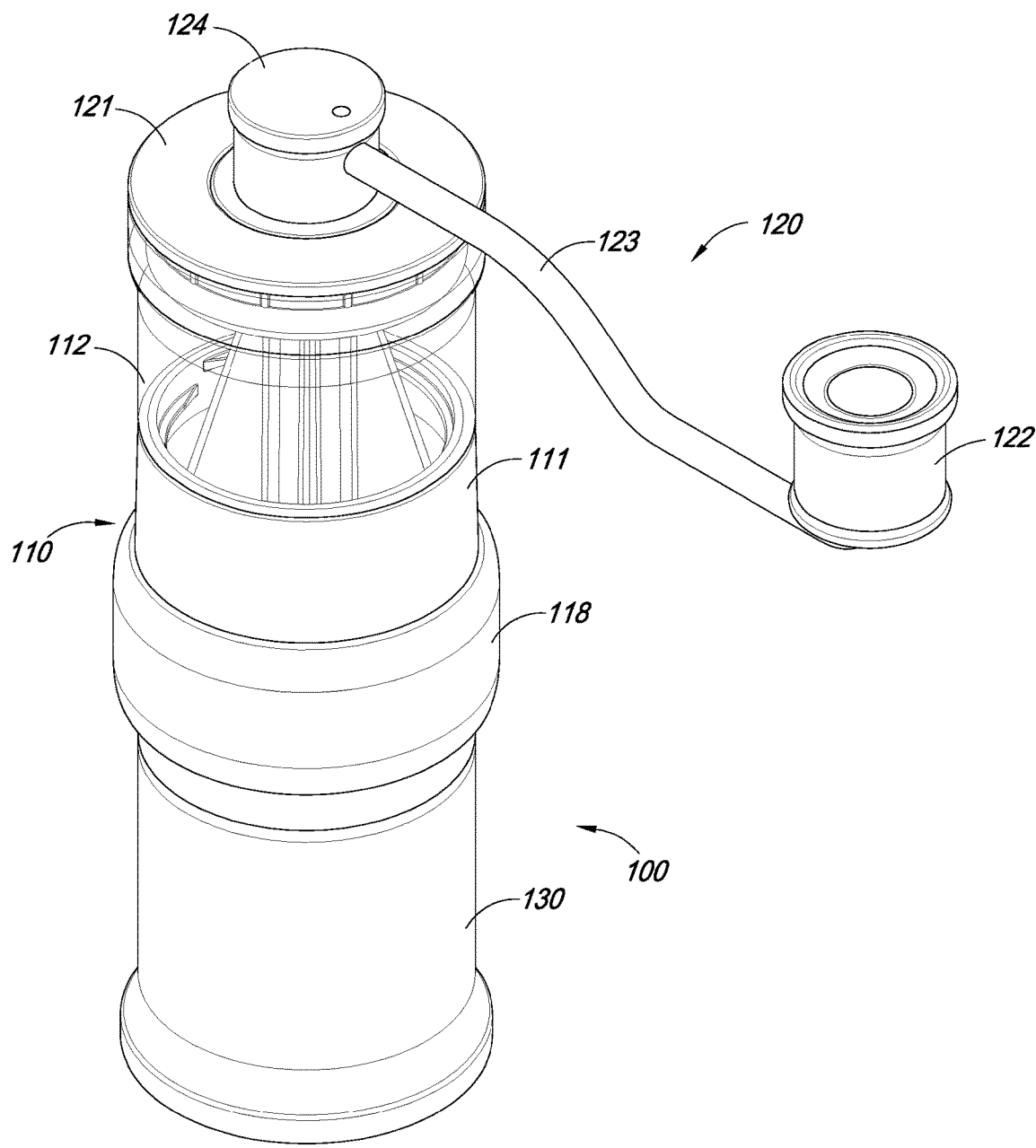
FIG. 2A is a perspective view of an embodiment of a grinder.
Figure 2B:
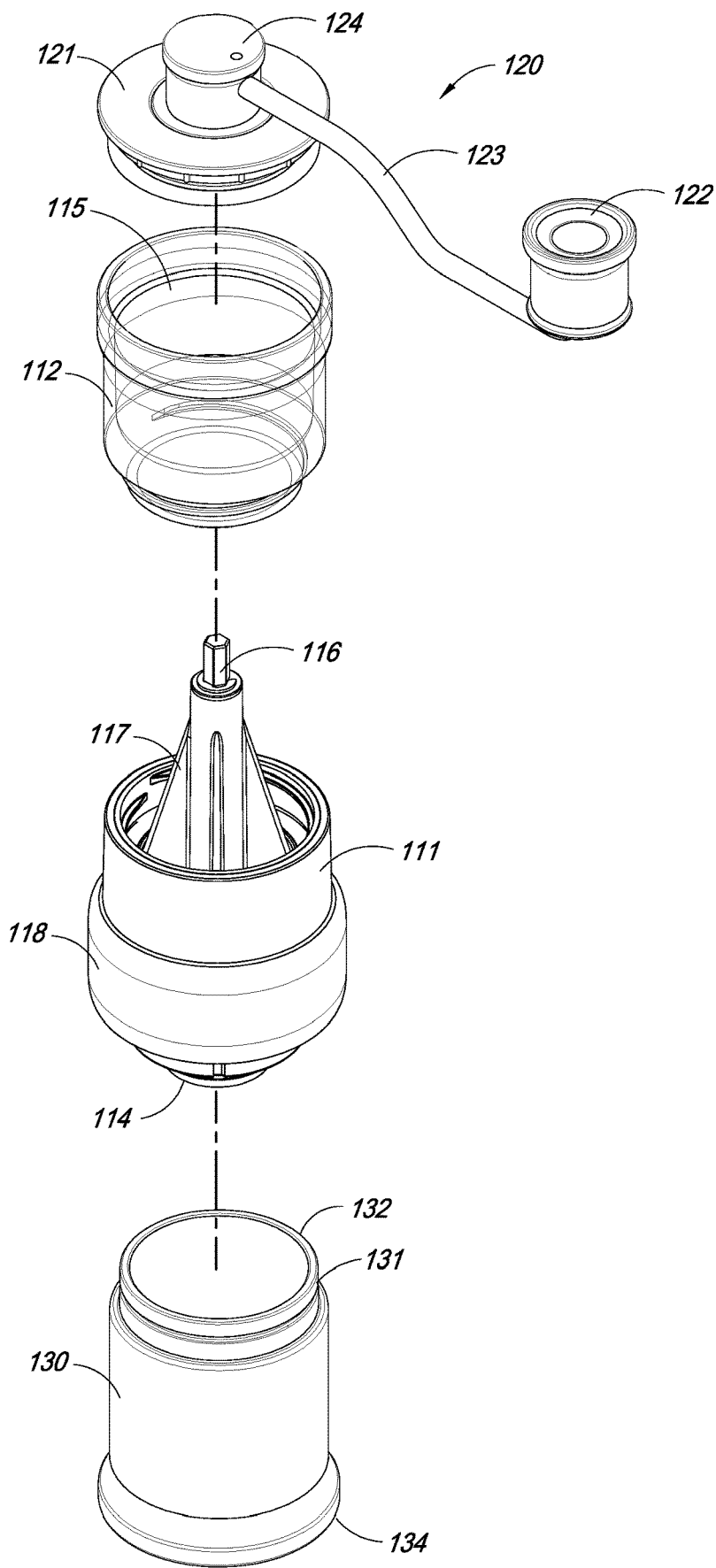
FIG. 2B is an exploded perspective view of the grinder of FIG. 2A.
Figure 3A:
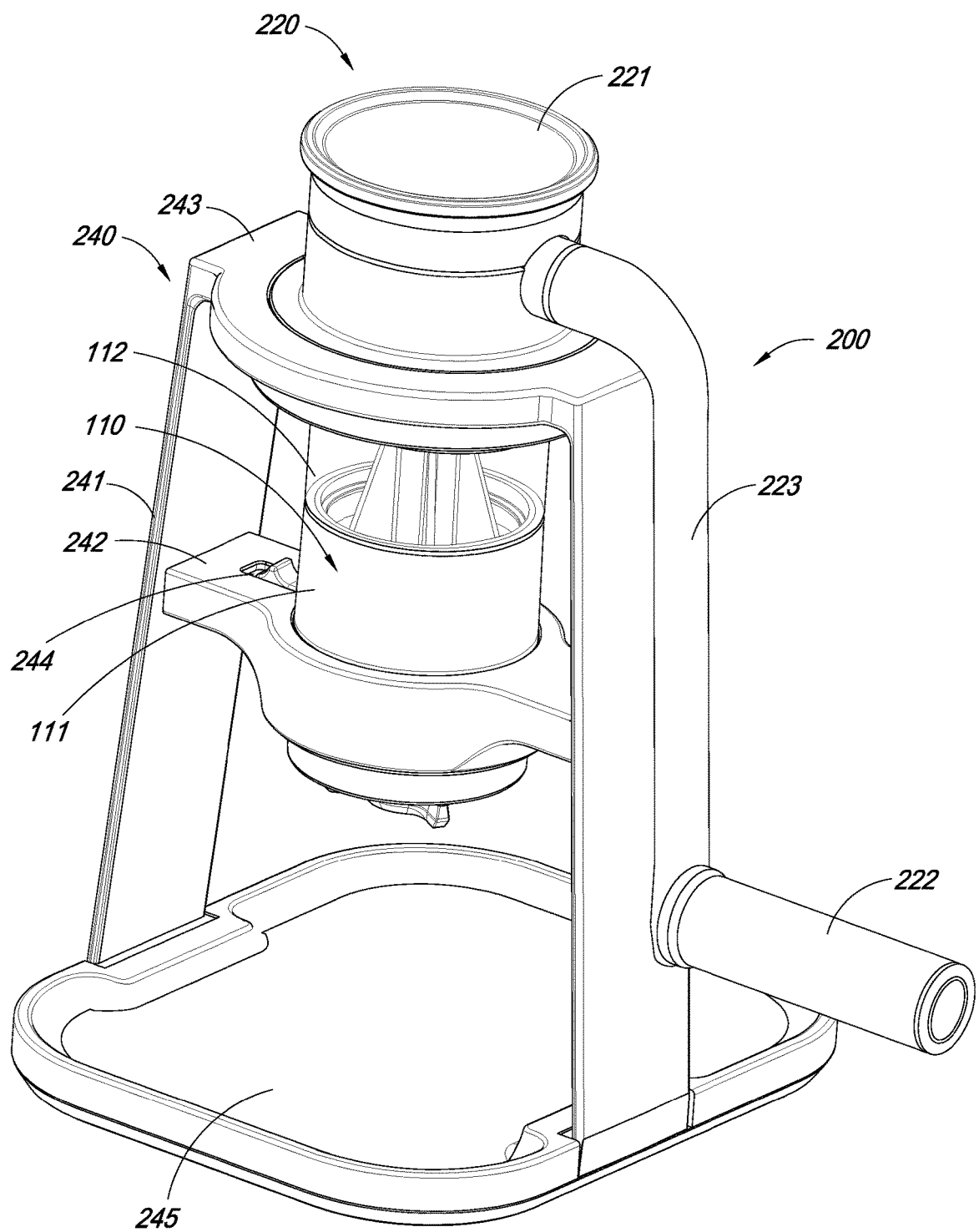
FIG. 3A is a perspective view of an embodiment grinder.
Figure 3B:
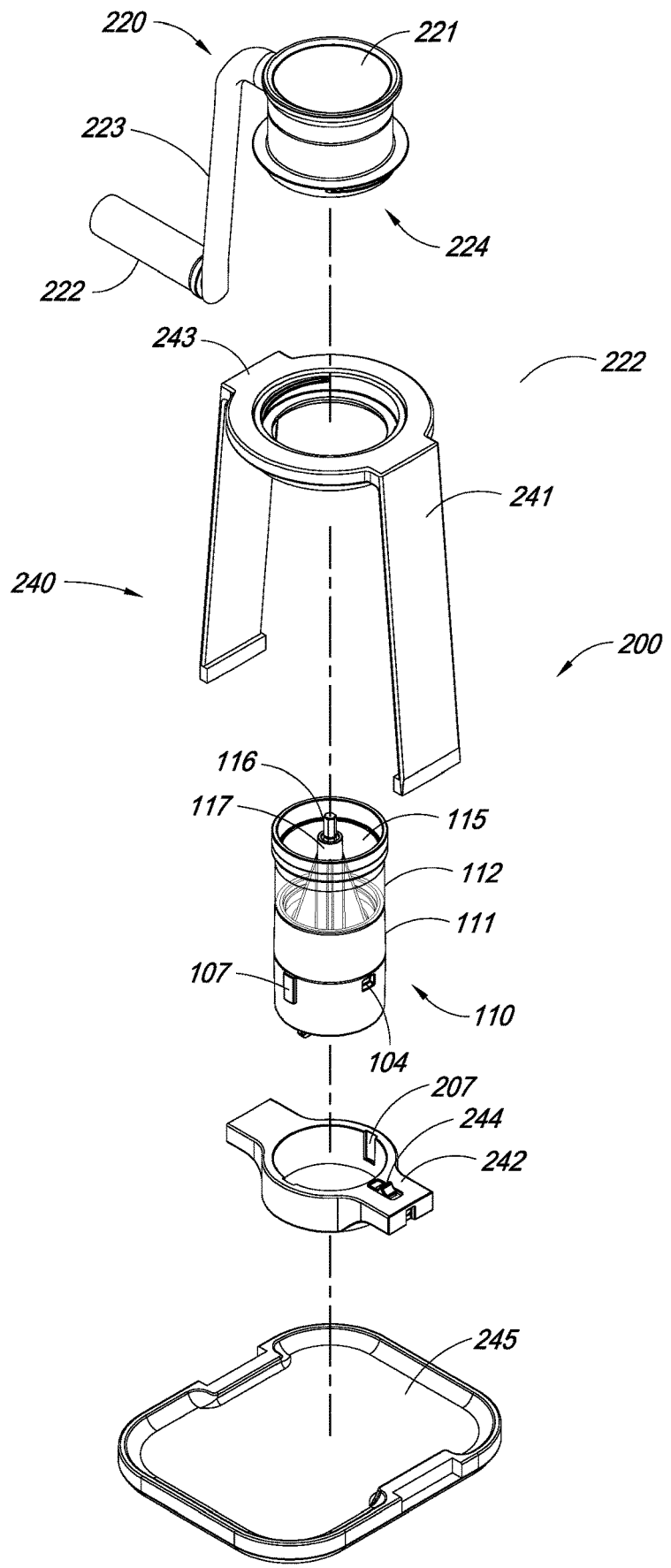
FIG. 3B is an exploded perspective view of the grinder of FIG. 3A.

In some embodiments, the grinding unit 110 can be used in a first grinder configuration to form a grinder 100 as shown in FIGS. 2A and 2B. In some embodiments, the grinding unit 110 can be used in a second grinder configuration to form a grinder 200 as shown in FIGS. 3A and 3B.

In some embodiments, the grinding unit 110 can include a plurality of grinding surfaces 113. In some embodiments, the grinding surfaces 113 can include one or more blades, teeth, and/or any other suitable grinding surfaces. In use, the grinding surfaces 113 can slice, chew, break, or otherwise grind input materials into a finer product. For example, in some embodiments, the grinding surfaces 113 can slice, chew, break, or otherwise grind coffee beans into coffee grounds.

With reference to FIGS. 1A-D, in some embodiments, the grinding unit 110 can include a body 111. The body 111 can be cylindrical, rectangular, conical, pyramidal, or any other suitable shape. In some embodiments, the body 111 can form a housing for one or more components of the grinding unit 110. For example, in some embodiments, the body 111 can house the grinding surfaces 113. In some embodiments, the inner surfaces of the body 111 can at least partially define an inner cavity 119 of the grinding unit 110 positioned superior to the grinding surfaces 113.

In some embodiments, the grinding unit 110 can include a coupling feature 107. In some embodiments, the coupling feature 107 can be configured to couple with a base or frame to align and/or secure the grinding unit 100 therein. In some embodiments, the coupling feature 107 can be a protrusion. In some embodiments, the coupling feature 107 can be configured to engage a slot, recess, or opening of a base or frame to align and/or secure the grinding unit there.

In some embodiments, the grinding unit 110 can include a coupling feature 109. In some embodiments, the coupling feature 109 can configured to couple with a base or frame to align or secure the grinding unit 100 therein. In some embodiments, the coupling feature 109 can be an opening or recess. In some embodiments, the coupling feature 109 can be configured to engage a protrusion or projection of a base or frame to align and/or secure the grinding unit there.

In some embodiments, the grinding unit 110 can include a viewing window 112. The window 112 can be transparent, substantially transparent, or semi-transparent. In some embodiments, the window 112 can form a housing for one or more components of the grinding unit 110. For example, in some embodiments, the window 112 can house the grinding surfaces 113. In some embodiments, the window 112 and body 111 can together form a housing for one or more components of the grinding unit 110. For example, in some embodiments, the window 112 and body 111 can together house grinding surfaces 113. In some embodiments, the window 112 can be coupled to or secured to the body 111. In some embodiments, the window 112 can be welded to the body 111. In some embodiments, inner surfaces of the window 112 can at least partially define the inner cavity 119. In some embodiments, inner surfaces of the body 111 and window 112 can define the inner cavity 119. In other embodiments, there is no viewing window 112, and the body 111 is formed in the area where a viewing window 112 would have been disposed.

In some embodiments, the window 112 can provide visual access to at least a portion of the interior of the grinding unit 110. For example, in some embodiments, the window 112 can provide visual access to the grinding surfaces 113.

In some embodiments, the window 112 can be cylindrical, rectangular, conical, pyramidal, or any other suitable shape. In some embodiments, the shape of the window 112 can match and/or complement the shape of the body 111. In some embodiments, the window 112 can be coupled to, secured to, integrally formed with, or otherwise attached to the cylindrical body 111.

In some embodiments, one or more components of the grinding unit 110 can be modifiable or adjustable by a user. For example, in some embodiments, one or more components of the grinding unit 110 can be modified or adjusted to change an average size or fineness of the product produced by the grinding unit 110. In some embodiments, the grinding unit 110 can include an input component 114, which can be manipulated to adjust a size or fineness of the product of the grinding unit 110. In some embodiments, the input component 114 can be a knob, a dial, a slider, a switch, or any other suitable input component. In some embodiments, the input component 114 can be mechanically coupled to the grinding surfaces 113 such that manipulation of the input component 114 causes the grinding surfaces 113 to move. In some embodiments, the input component 114 can be manipulated by rotating the input component 114, dialing the input component 114, sliding the input component 114, and/or switching the input component 114 between different configurations.

In some embodiments, the input component 114 can be manipulated to cause the grinding surfaces 113 to move laterally or radially. In some embodiments, the input component 114 can be manipulated to cause the grinding surfaces 113 to move closer or farther from each other. In some embodiments, the input component 114 can be manipulated to cause at least one of the grinding surfaces 113 to move superiorly or inferiorly relative to another one of the grinding surfaces 113. In some embodiments, the input component 114 can be manipulated to cause the grinding surfaces 113 to move superiorly and/or inferiorly within the body 111 of the grinding unit 110. In some embodiments, the input component 114 can be manipulated to cause the grinding surfaces 113 to engage or disengage one another. In some embodiments, the input component 114 can be manipulated to cause at least one of the grinding components to engage or disengage from spinning. In some embodiments, the input component 114 can be positioned on a bottom surface or underside of the grinding unit 110.

In some embodiments, the grinding unit 110 can be disassemblabled. In some embodiments, the grinding surfaces 113 can be replaced, changed, or modified within the grinding unit 110. In some embodiments, the grinding surfaces 113 can be replaced, changed, or modified to adjust the fineness of the resultant coffee grounds, replace or repair broken grinding surfaces 113, and or remove the grinding surfaces 113 for sharpening.

In some embodiments, the grinding unit 110 can include an opening 115. In some embodiments, the opening 115 can be a handle opening. In some embodiments, the opening 115 can be defined by a top edge of the grinding unit 110. In some embodiments, the opening 115 can be defined by a top edge of the walls of the viewing window 112. In some embodiments, the opening 115 can be circular, ellipsoid, square, rectangular, triangular, polygonal or any other suitable shape. In some embodiments, the opening 115 can be defined by a top edge of the walls of the body 111.

In some embodiments, the grinding unit 110 can include a driver which turns the grinding surfaces 113. By turning the grinding surfaces 113, the driver can effectuate grinding of the input material. In some embodiments, the grinding unit can include a drive shaft 116. In some embodiments, the drive shaft 116 can be manipulated to turn the grinding surfaces 113. In some embodiments, the drive shaft 116 can be a cylindrical shaft. In some embodiments, the drive shaft 116 can extend between the handle opening 115 and the grinding surfaces 113. In some embodiments, the drive shaft 116 can extend from the handle opening 115 or near the handle opening 115 to the grinding surfaces 113 or near the grinding surfaces 113.

In some embodiments, the drive shaft 116 can be coupled to the grinding surfaces 113. The drive shaft 116 can be directly or indirectly coupled to the grinding surfaces 113. In some embodiments, the drive shaft 116 can be coupled to the grinding surfaces 113 such that movement of the drive shaft 116 can cause movement of the grinding surfaces 113. In some embodiments, the drive shaft 116 can be coupled to the grinding surfaces 113 such that rotation of the drive shaft 116 can cause rotation of the grinding surfaces 113.

In some embodiments, the drive shaft 116 can be coupled to the grinding surfaces 113 via one or more gearing components. In some embodiments, the rotation of the drive shaft 116 can rotate one or more gears, and rotation of the one or more gears can cause the grinding surfaces 113 to move. In some embodiments, the gearing components can be utilized such that the blades/and or teeth 113 do not undergo a full rotation for every full rotation of the drive shaft 116. In some embodiments, the grinding surfaces 113 rotate at a particular ratio relative to the rotation of the drive shaft 116. For example, in some embodiments, the grinding surfaces 113 could rotate once for every two rotations of the drive shaft 116.

In some embodiments, the grinding unit 110 can include an inner housing 117. The inner housing can be positioned within one or both of the body 111 and the window 112. In some embodiments, the inner housing 117 can be coupled to or secured to one or both of the body 111 and the window 112. In some embodiments, the inner housing 117 can be welded together with one or both of the body 111 and the window 112. In some embodiments, the inner housing 117 can house one or more gearing components. In some embodiments, the inner housing 117 can house at least a portion of the drive shaft 116. In some embodiments, the inner housing 117 can be coupled to the drive shaft 116 so that rotation of the drive shaft 116 causes rotation of the inner housing 117. In some embodiments, the inner housing 117 can include one or more surface features configured to facilitate movement of an input material from the inner cavity 119 towards the grinding surfaces 113.

In some embodiments, grinding unit 110 can include a set of feeder blades 127. In some embodiments, the feeder blades 127 can extend from an exterior surface of the inner housing 117. In some embodiments, the feeder blades 127 can be integrally formed with the inner housing 117. In some embodiments, the feeder blades 127 can be disposed circumferentially about the inner housing 117.

In some embodiments, the feeder blades 127 can be disposed circumferentially about the drive shaft 116. In some embodiments, the feeder blades 127 can be coupled to the drive shaft 116 so that rotation of the drive shaft 116 causes rotation of the feeder blades 127. In some embodiments, the feeder blades 127 can be coupled to the drive shaft via the inner housing 117. In some embodiments, the feeder blades 127 can be positioned between the inner housing 117 and the grinding surfaces 113.

In some embodiments, the feeder blades 127 can facilitate the migration of input materials, such as coffee beans, from the inner cavity 119 of the grinding unit body 111 to the grinding surfaces 113. In use, the feeder blades 127 can move or dislodge materials, such as coffee beans, that have become stuck or are otherwise failing to move into the grinding surfaces 113. In some embodiments, the feeder blades 127 can rotate to move or dislodge materials that have become stuck or are otherwise failing to move into the grinding surfaces 113.

The grinding unit 110 can be coupled to one or more other components to form different coffee grinder configurations. In some embodiments, the same grinding unit 110 can be used in at least a portable configuration and a table-top configuration. Although certain configurations are disclosed herein, a person of skill in the art will understand that due to its modular design, the components of the coffee grinder can be used to form many different configurations.

Figure 2C:
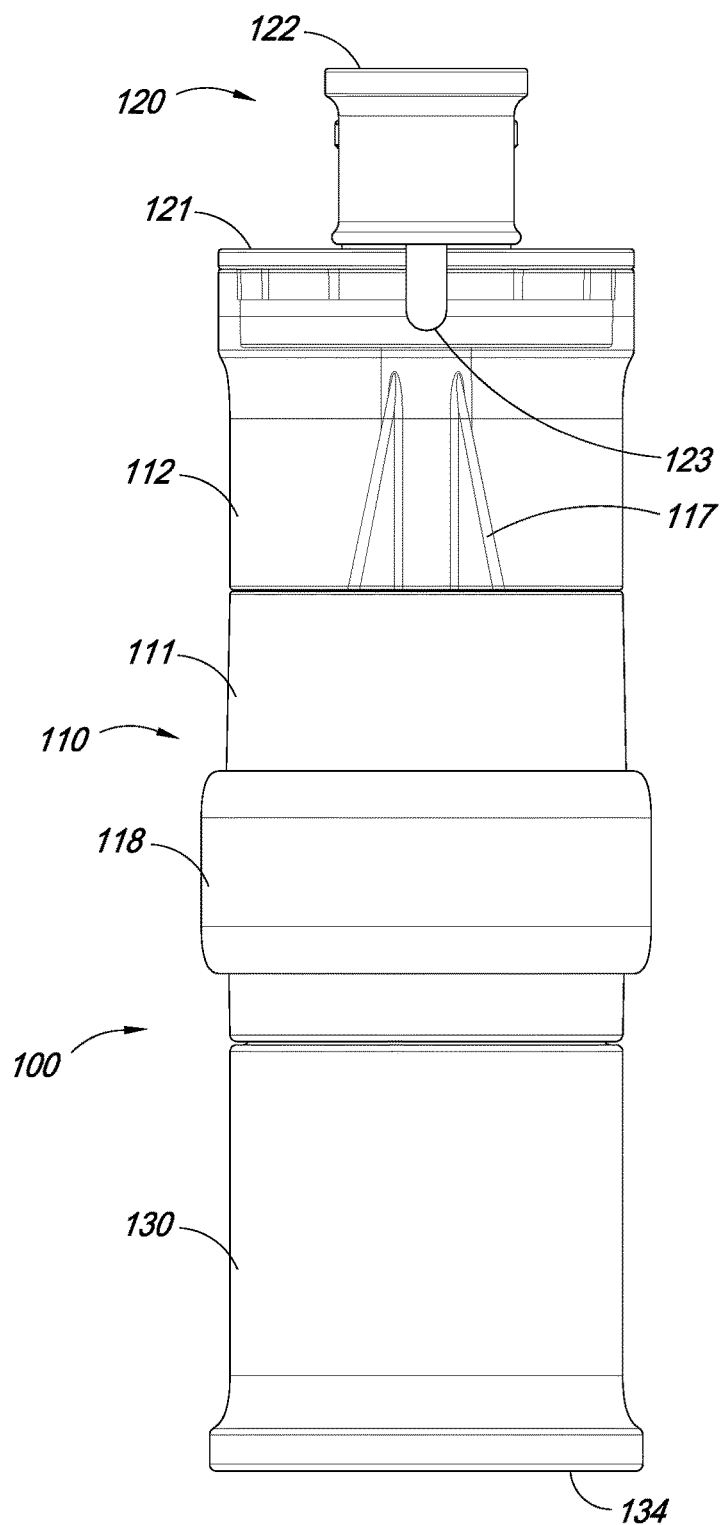
FIG. 2C is a first side view of the grinder of FIG. 2A.
Figure 2D:
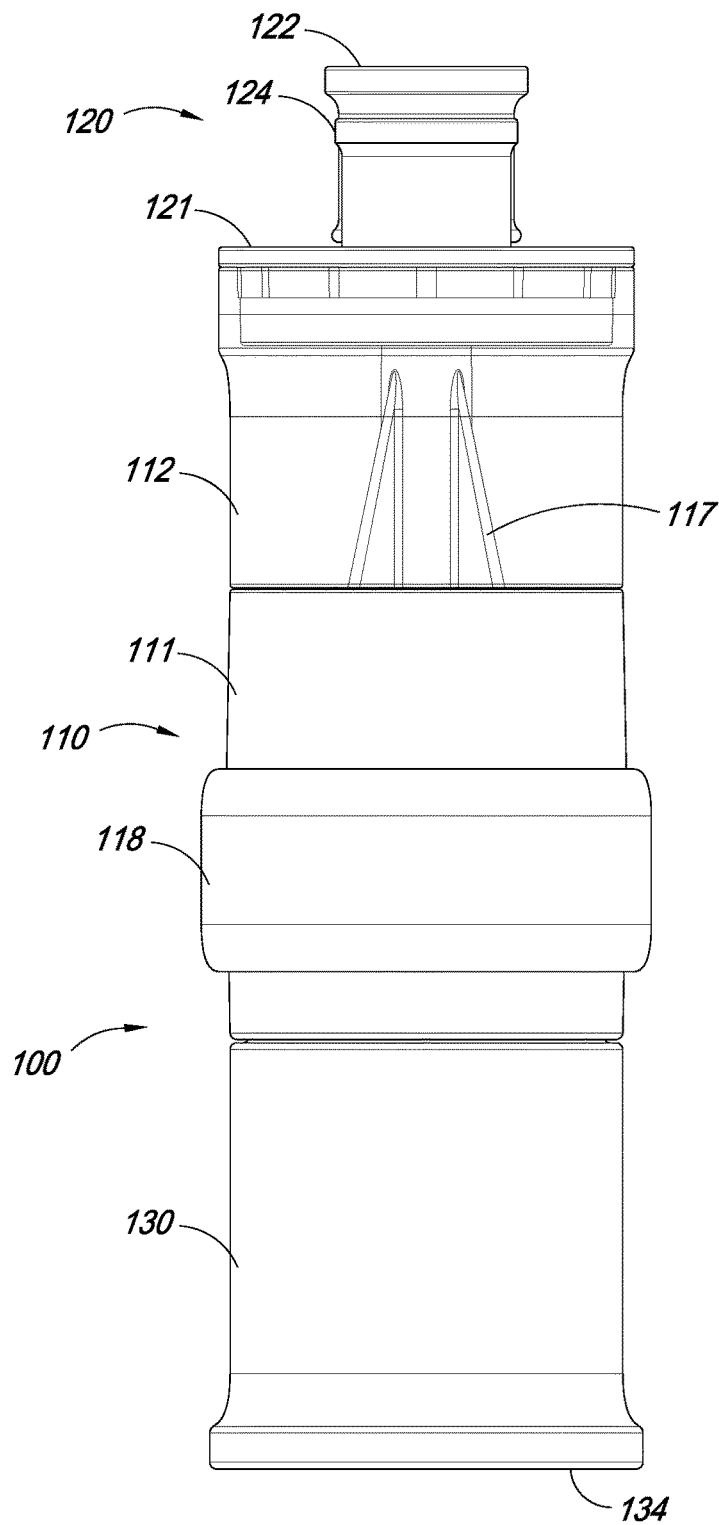
FIG. 2D is a second side view of the grinder of FIG. 2A.
Figure 2E:
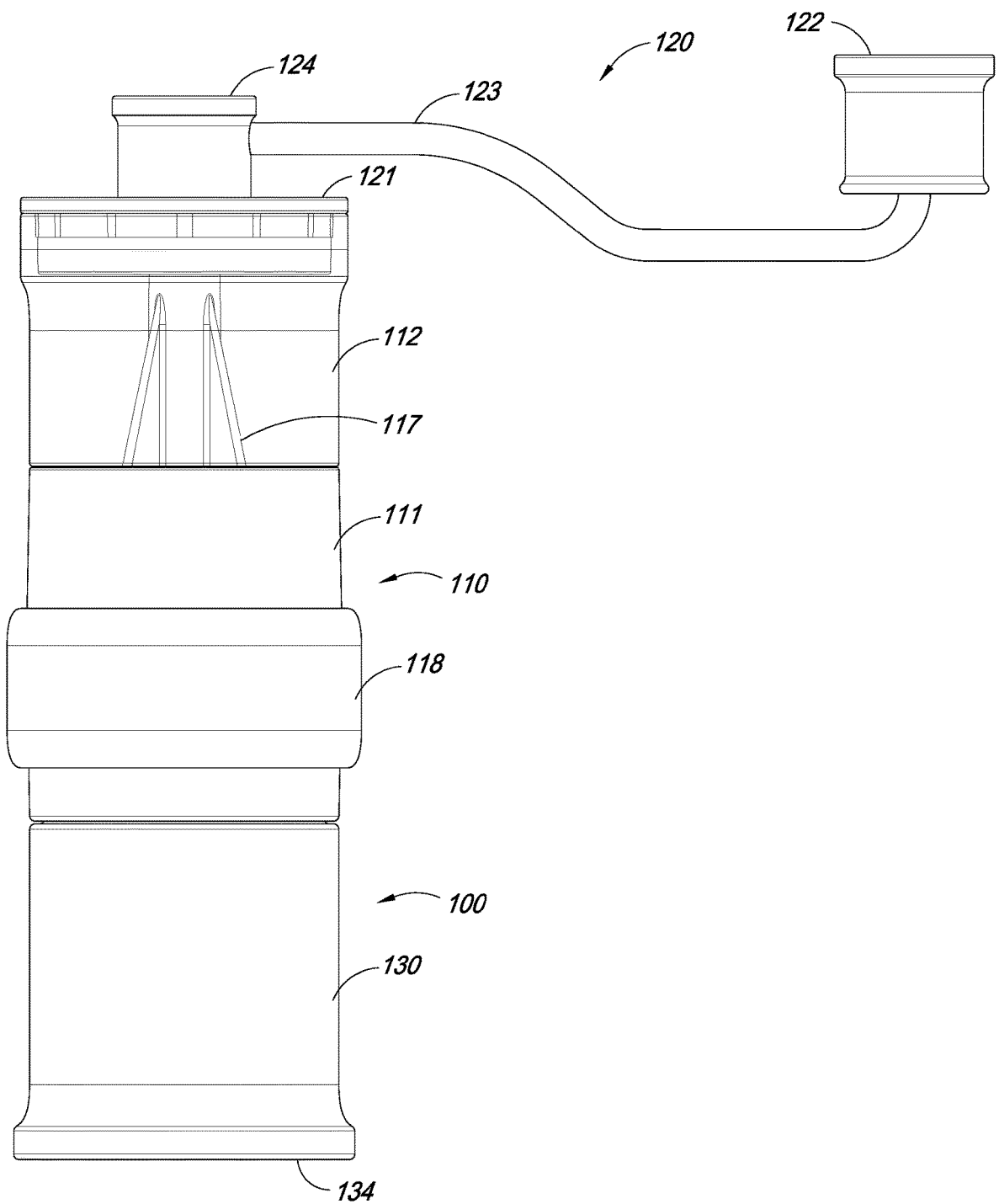
FIG. 2E is a front view of the grinder of FIG. 2A.
Figure 2F:
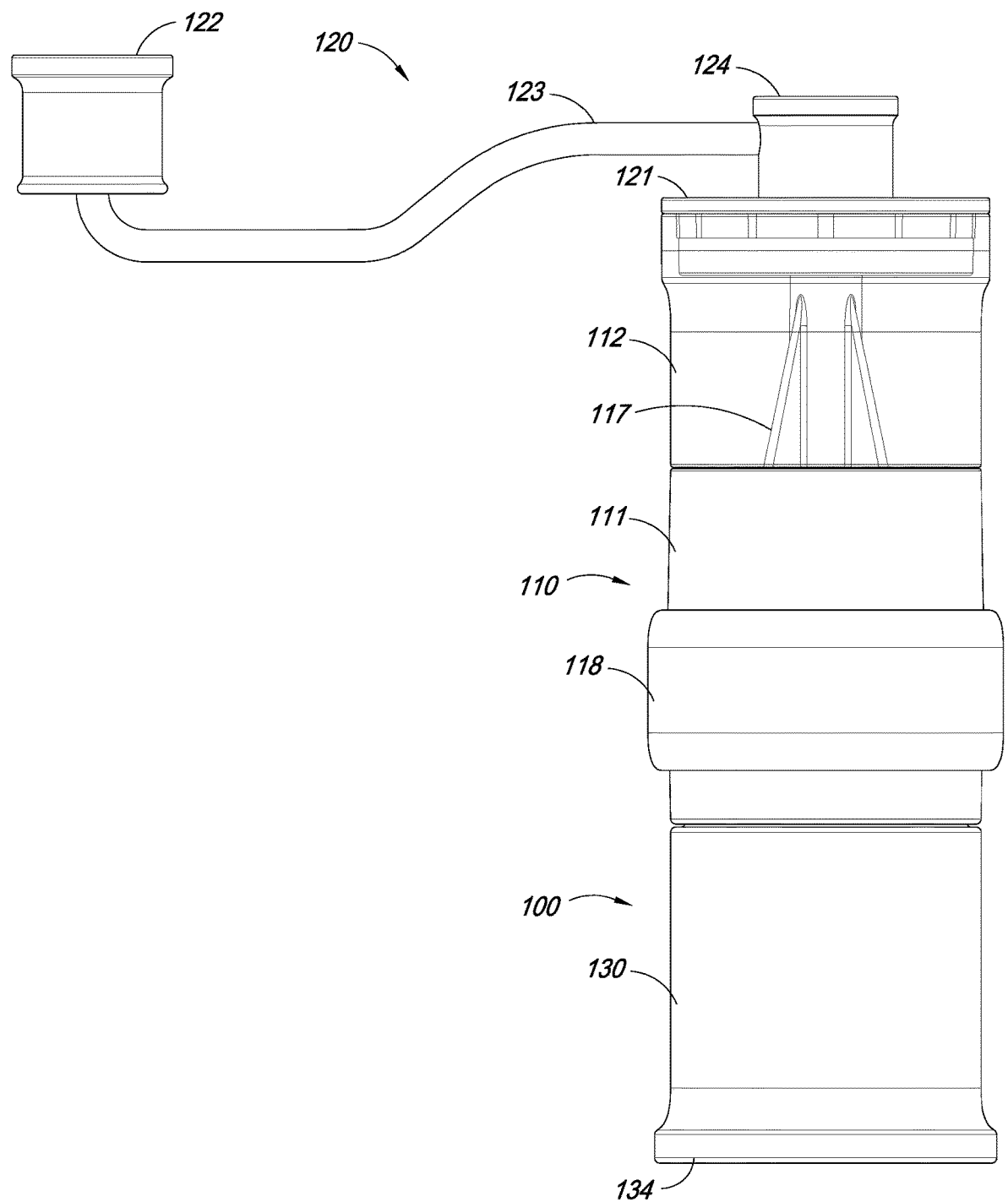
FIG. 2F is a rear view of the grinder of FIG. 2A.
Figure 2G:
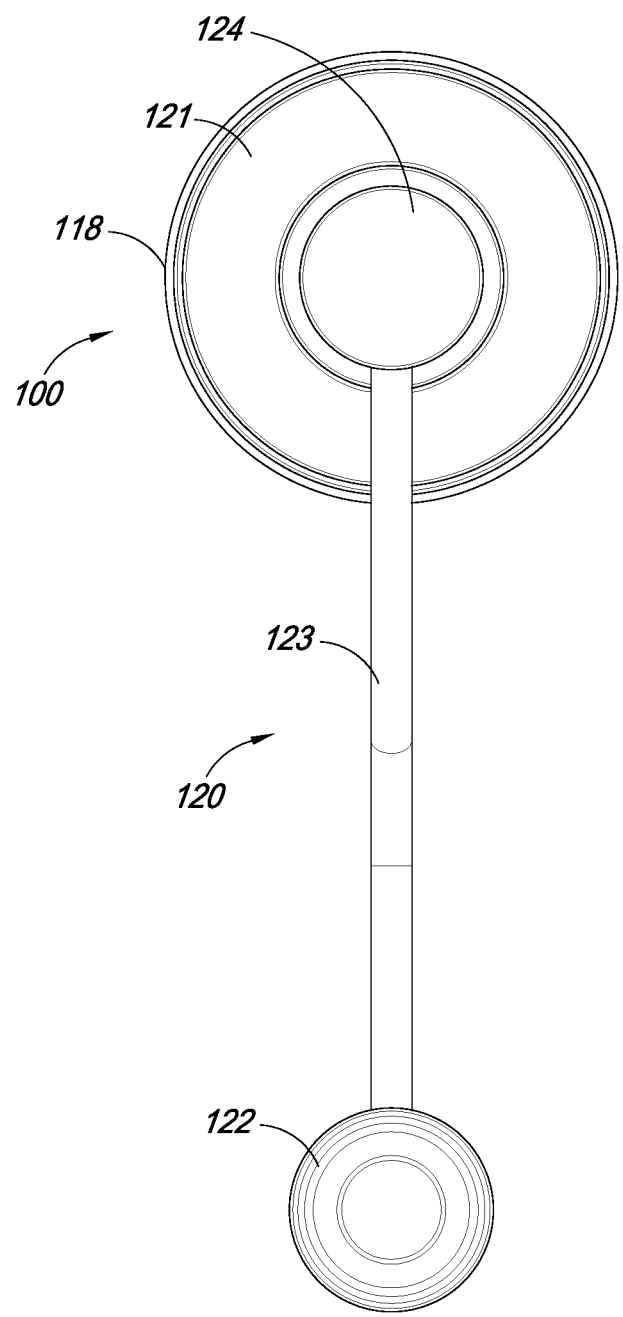
FIG. 2G is a top view of the grinder of FIG. 2A.
Figure 2H:
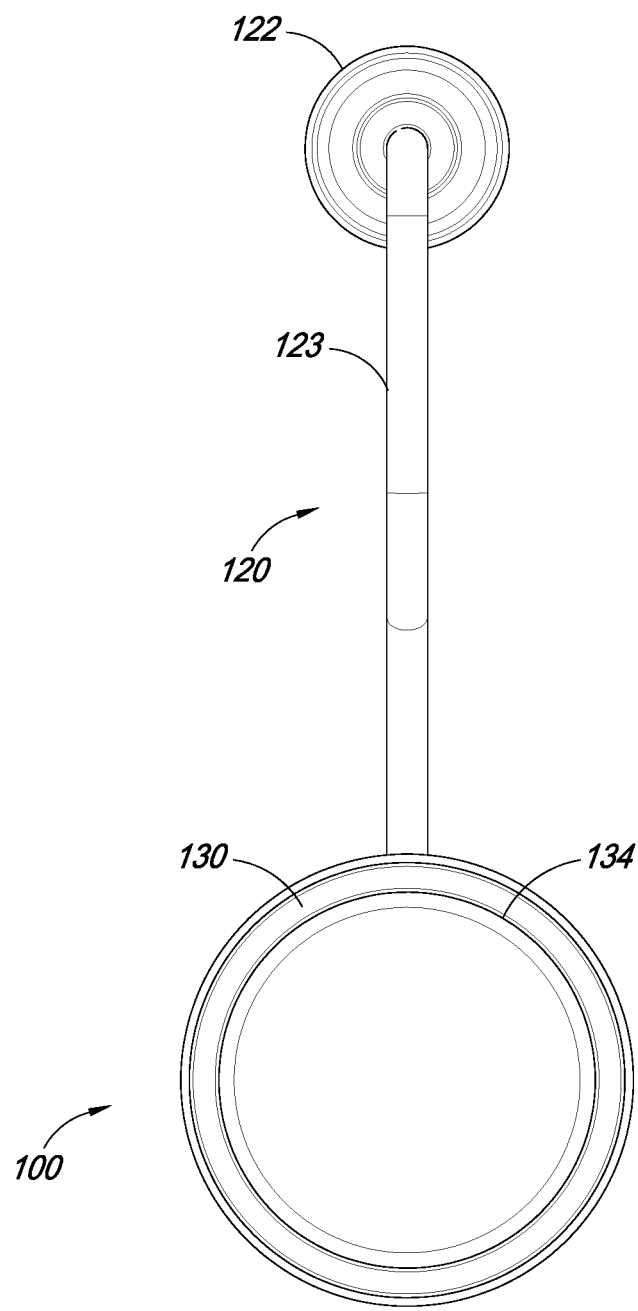
FIG. 2H is a bottom view of the grinder of FIG. 2A.
Figure 2I:
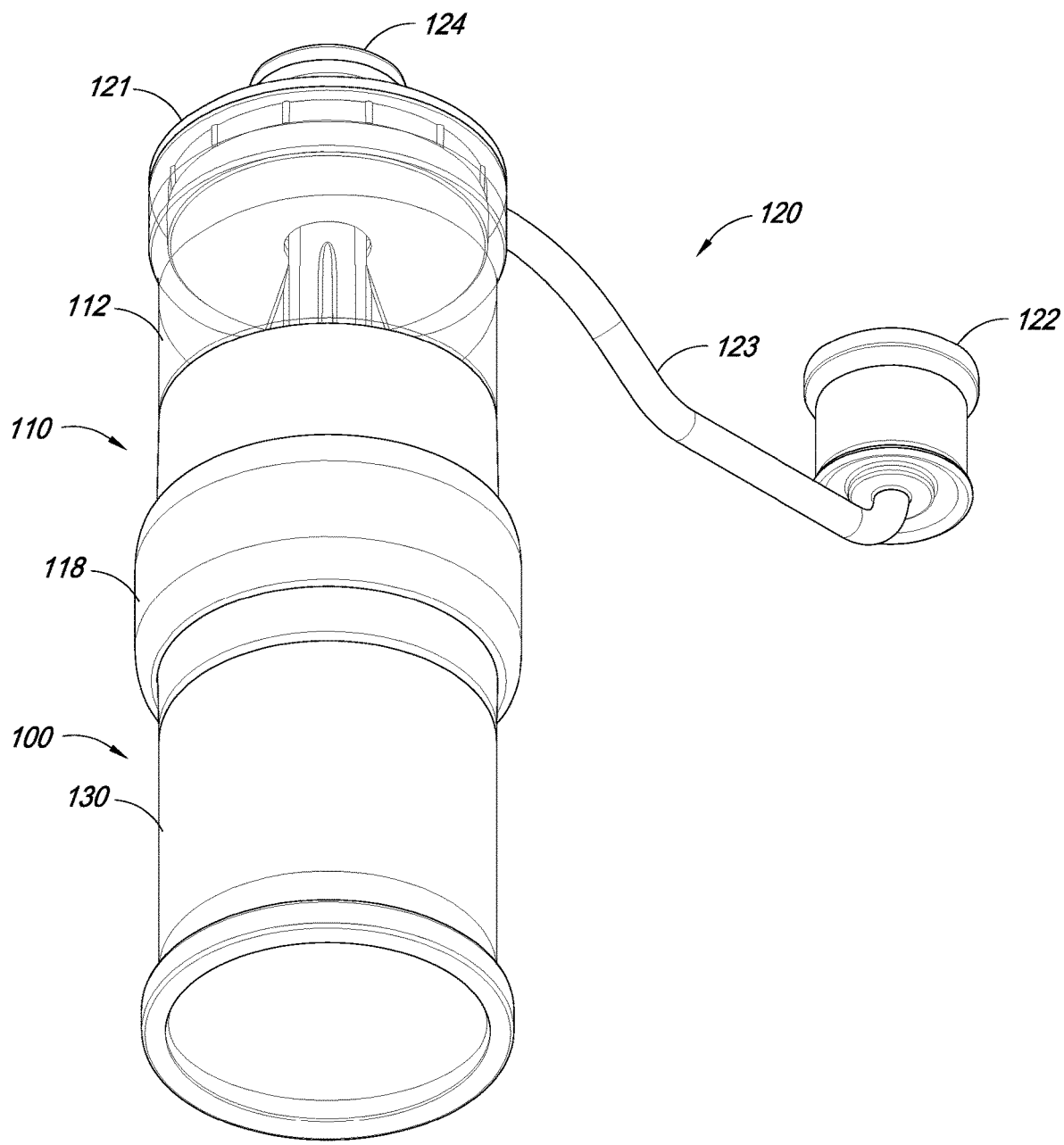
FIG. 2I is a bottom perspective view of the grinder of FIG. 2A

FIGS. 2A-2I show an illustration of the modular grinder system in a first configuration forming a grinder 100. In some embodiments, the configuration of the grinder 100 can be a hand-held or portable configuration. FIG. 2A shows a perspective view of the grinder 100. FIG. 2B shows an exploded view of the grinder 100. FIG. 2C shows a first side view of the grinder 100. FIG. 2D shows a second side view of the grinder 100. FIG. 2E shows a front view of the grinder 100. FIG. 2F shows a rear view of the grinder 100. FIG. 2G shows a top view of the grinder 100. FIG. 2H shows a bottom view of the grinder 100. FIG. 2I shows a bottom perspective view of the grinder 100.

In some embodiments, the grinder 100 can include a handle unit 120. In some embodiments, the handle unit 120 can couple to the grinding unit 110. In some embodiments, the handle unit 120 can removably couple to the grinding unit 110.

In some embodiments, the handle unit 120 can include a cap 121. In some embodiments, the cap 121 can couple to the grinding unit 110. In some embodiments, the cap 121 can removably couple to the grinding unit 110. In some embodiments, the cap 121 can engage a top edge or superior section of the viewing window 112. In certain embodiment, the cap 121 can engage the inner surfaces of the walls of the viewing window 112. In some embodiments, the cap 121 can rest on the top edge of the viewing window 112. In some embodiments, the cap 121 can engage a top edge or superior section of the body 111. In some embodiments, the cap 121 can engage the inner surfaces of the walls of the body 111. In some embodiments, the cap 121 can rest on the top edge of the body 111. In some embodiments, the cap 121 can be at least partially received within the inner cavity 119 of the grinding unit 110.

In some embodiments, the handle unit 120 can include a transmission component 124. In some embodiments, the transmission component 124 can be coupled to the cap 121. In some embodiments, the transmission component 124 can be rotatably seated within the cap 121 so that the transmission component 124 can rotate within the cap 121.

In some embodiments, the transmission component 124 can be configured to couple to the drive shaft 116. In some embodiments, the transmission component 124 can couple to the drive shaft 116 when the cap 121 is coupled to the grinding unit 110. In some embodiments, the transmission component 124 can couple to the drive shaft 116 when the cap 121 is coupled to the grinding unit 110 so that the drive shaft 116 may be rotated by the rotation of the transmission component 124.

In some embodiments, the transmission component 124 can extend through the cap 121 such that a portion of the transmission component 124 projects from the handle cap 121.

In some embodiments, the handle unit 120 can include an arm 123. In some embodiments, the arm 123 can be coupled to the transmission component 124. In some embodiments, manipulation of the arm 123 can cause rotation of the transmission component 124.

In some embodiments, the handle unit 120 can include a knob 122. In some embodiments, the knob 122 can be disposed on or otherwise coupled to the arm 123. In some embodiments, the arm 123 can extend between the knob 122 and the transmission component 124.

In some embodiments, a user can cause the grinding surfaces 113 to rotate by rotating the knob 122 and/or arm 123. In some embodiments, in operation, a user can grip the knob 122 and move the knob 122 to move the arm 123. In some embodiments, the knob 122 can be manipulated to rotate the arm 123. In some embodiments, the arm 123 can be rotated about the transmission component 124. In some embodiments, the arm 123 can be rotated about an axis. In some embodiments, the arm 123 can rotate about an axis parallel with a longitudinal axis of the drive shaft 116. Rotation of the arm 123 can cause the transmission component 124 to rotate. In some embodiments, the rotation of the arm 123 can be transmitted by the transmission component 124 to the grinding surfaces 113. In some embodiments, rotation of the arm 123 can be transmitted by the transmission component 124 to the grinding surfaces 113 via the drive shaft 116. In this way, the manipulation of the arm 123 can be used to drive the grinder and effectuate grinding of the input material.

As shown in FIG. 2A, in some embodiments, the handle 120 can rotate about the grinder 100 horizontally. In some embodiments, the knob 122 and/or arm 123 can rotate about the grinder 100 horizontally. That is to say, in some embodiments, the handle 120 shown can rotate in a helicopter style in which the knob 122 and/or arm 123 maintain the same or substantially the same vertical position during rotation when the grinder 100 is in a vertical position. In some embodiments, the handle 120 can rotate such that the knob 122 and/or arm 123 maintain the same or substantially the same vertical position during rotation relative to the grinding unit 110 when the grinder 100 is in a vertical position. In operation, the handle knob 222 and/or arm 223 will move forwards and backwards and left and right in the view shown in FIGS. 2E and 2F.

In some embodiments, the grinder 100 can include a grip 118. In some embodiments, the grip 118 can provide one or more surfaces that facilitate gripping or grasping of the grinder 100 by a user. In some embodiments, the grip 118 can be composed of a material that creates friction between the grip 118 and a hand of a user. In some embodiments, the grip 118 can be composed of a material that includes a degree of roughness and/or stickiness to create friction between the grip 118 and a hand of a user. In some embodiments, the grip 118 can include one or more surface features that facilitate gripping or grasping of the grinder 100 by a user. For example, in some embodiments, the grip 118 can include one or more protrusions, bumps, ridges, grooves, or other surface textures to facilitate gripping or grasping of the grinder 100 by a user.

In some embodiments, the grip 118 can be in the shape of a band which can be disposed on an outer face of the grinder body 111. In some embodiments, the grip 118 can be a circular band. In some embodiments, the grip 118 can be removable. In some embodiments, the grip 118 can be capable of being swapped, modified, or replaced by a user. In some embodiments, the grip 118 may inhibit, at least to some degree, rotation of the grinder 100 in a user's hand. In some embodiments, the grip 118 can allow a user to rotate the handle knob 122 and/or arm 123 without the grinding unit 110 rotating in a user's hand.

In some embodiments, the grip 118 can be formed of a flexible material. In some embodiments, the grip 118 can be formed of one or more polymers. In some embodiments, the grip 118 can be formed of rubber. In some embodiments, the grip 118 can include a strip of rubber. In some embodiments, the grip 118 can include a strip of plastic.

In some embodiments, the grinder 100 can include a receptacle 130. In some embodiments, the receptacle 130 can be a hollow cylinder that is closed on one end. In some embodiments, the receptacle 130 can have an open top end 132 and a closed bottom end 134. In some embodiments, the receptacle 130 can be capable of attaching or coupling to the grinding unit 110. In some embodiments, the receptacle 130 can be attached or coupled to the grinding unit 100 so that materials processed by the grinder 100, such as coffee grounds, fall into the receptacle 130 after being sliced, chewed, broken, or otherwise ground by the grinding unit 100. In some embodiments, the receptacle 130 can couple to the grinding unit 110 via complementary coupling features on a bottom portion of the grinding unit 110 and a top portion of the receptacle 130. As shown in FIG. 2B, in some embodiments, the receptacle 130 can include a coupling feature 131. In some embodiments, the receptacle 130 can couple to the grinding unit 110 via complementary threads on a bottom portion of the grinding unit 110 and a top portion of the receptacle 130. In some embodiments, the receptacle 130 can couple to the grinding unit 110 by one or more flanges, by one or more magnets or magnetic forces, by a friction fit between the components, or through any other suitable coupling mechanism, including but not limited to, mechanical or magnetic coupling.

In some embodiments, in operation, a user can place an input material, such as coffee beans, in the grinding unit 110 via the opening 115. In some embodiments, after placing the input material in the grinding unit, the user can connect the handle unit 120 to the grinding unit 110. In some embodiments, a user can optionally perform the steps of placing a grip 118 around the grinding unit 110 and/or connecting the receptacle 130 to the grinding unit 110. In some embodiments, the user then can grip the grinder 100 in one hand by placing that hand around the grinding unit 110 (and grip 118). While the handle unit 120 is coupled to the grinding unit 110, the user can turn the handle knob 122 and/or arm 123 to cause the grinding surfaces 113 to grind the input material into a finer product, for example, to grind coffee beans into coffee grounds. In some embodiments, the product can fall out of the bottom of the grinding unit 110 either into the receptacle 130 or another surface/container positioned beneath the grinding unit 110.

In some embodiments, the grinder 100 can be disassembled by removing the handle unit 120, grip 118, and/or receptacle 130 from the grinding unit 110. Disassembly of the grinder 100 can facilitate easier storage or transportation of the grinder 100. In some embodiments, disassembly can facilitate easier cleaning and maintenance of the grinder 100. In some embodiments, the grinding unit 110 can be disassembled. In some embodiments, one or more components can be removed from the grinding unit 110, including but not limited to, the viewing window 112, the drive shaft 116, the grinding surfaces 113, and the walls of the body 111. In some embodiments, a grinding unit 110 that is capable of disassembly and reassembly can allow a user to more easily clean, maintain, modify, and/or repair the grinder 100.

The grinder 100 can provide flexibility and versatility for a user due to its modular design. In some embodiments, the grinding unit 110 can be configured to couple to a plurality of handle units 120 having different shapes, sizes, and/or designs. In some embodiments, a user can customize the grinder 100 by purchasing or fabricating different handle units, and then attaching those handle units to the grinding unit 110.

In some embodiments, the grinding unit 110 can be configured to couple to a plurality of grips 118 having different shapes, sizes, and/or designs.

In some embodiments, the grinding unit 110 can be configured to couple to a plurality of receptacles 130 having different shapes, sizes, and/or designs.

In some embodiments, the grinder 100 can be configured to receive one or more attachments. For example, in some embodiments, the grinder 100 can be configured to receive a compact brewing unit. In some embodiments, a compact brewing unit can be coupled to the grinding unit 110. In some embodiments, a compact brewing unit can be coupled to the grinding unit 110 so that a user can produce coffee grounds which fall directly into the compact brewing unit, and the compact brewing unit can produce coffee without the need for a separate coffee machine or press.

In some embodiments, one or more components of the grinder 100 can be designed to provide for an aesthetically-pleasing portable grinder.

In some embodiments, one or more components of the grinder 100 can be used in a second coffee grinder having a different configuration from the grinder 100. In some embodiments, the grinder 100 is configured to transform from a hand-held or portable configuration to a table-top configuration. In some embodiments, the user can disassemble the grinder 100 and use the grinding unit 100 in a table-top configuration of a second coffee grinder. A table-top configuration can provide additional stability and may be a more aesthetically pleasing addition to the room which it occupies.

Figure 3C:
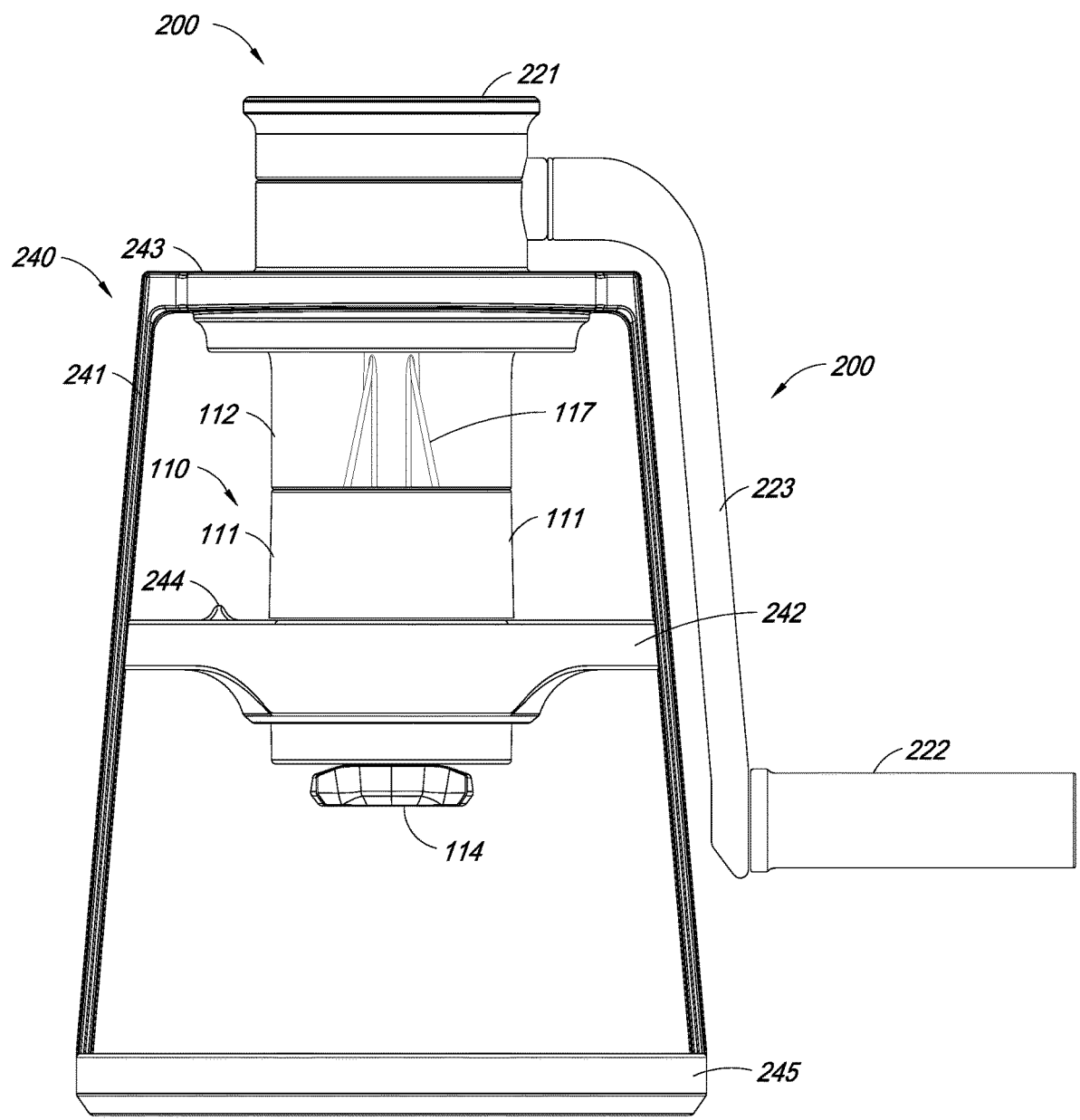
FIG. 3C is a front view of the grinder of FIG. 3A.
Figure 3D:
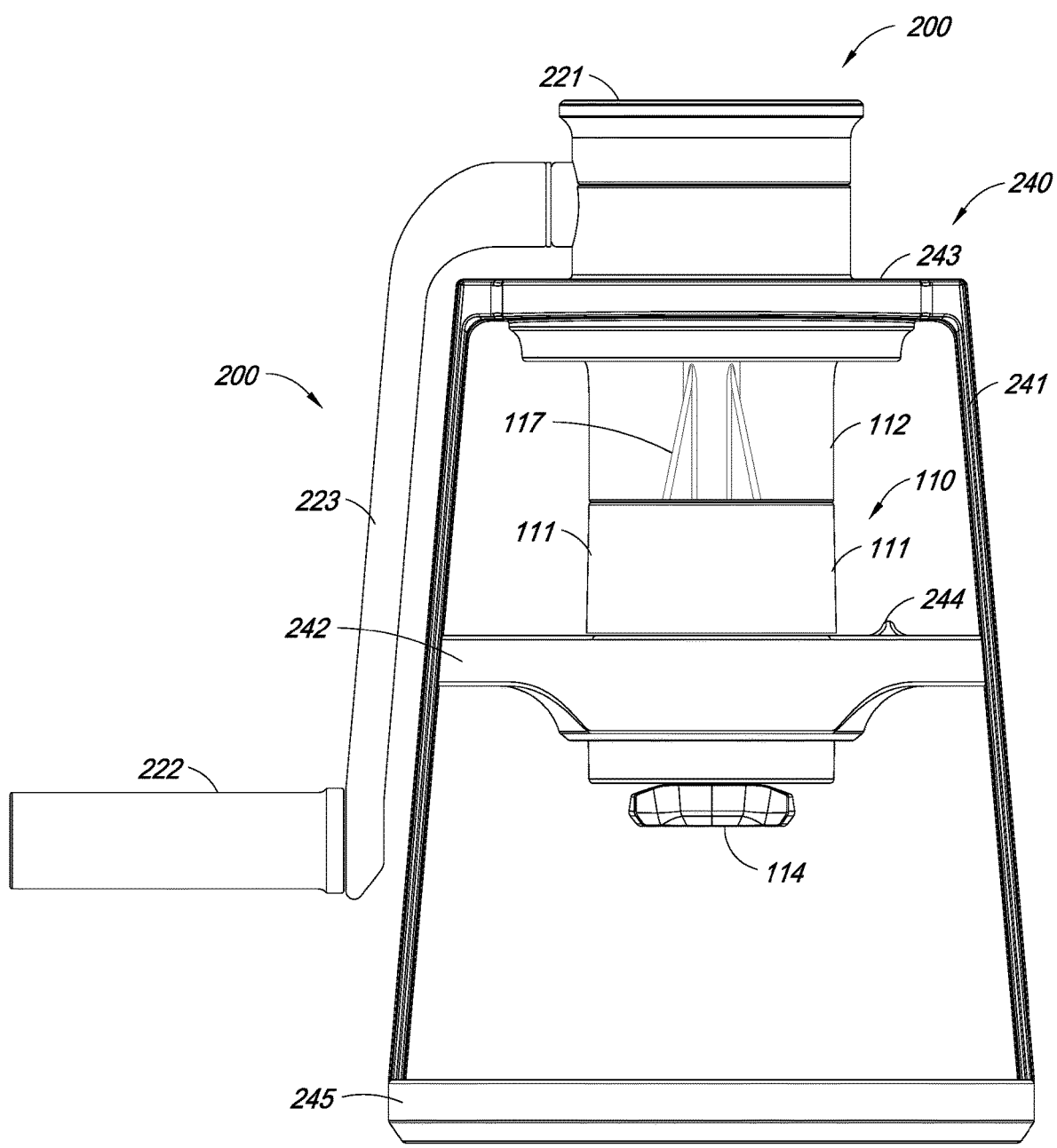
FIG. 3D is a rear view of the grinder of FIG. 3A.
Figure 3E:
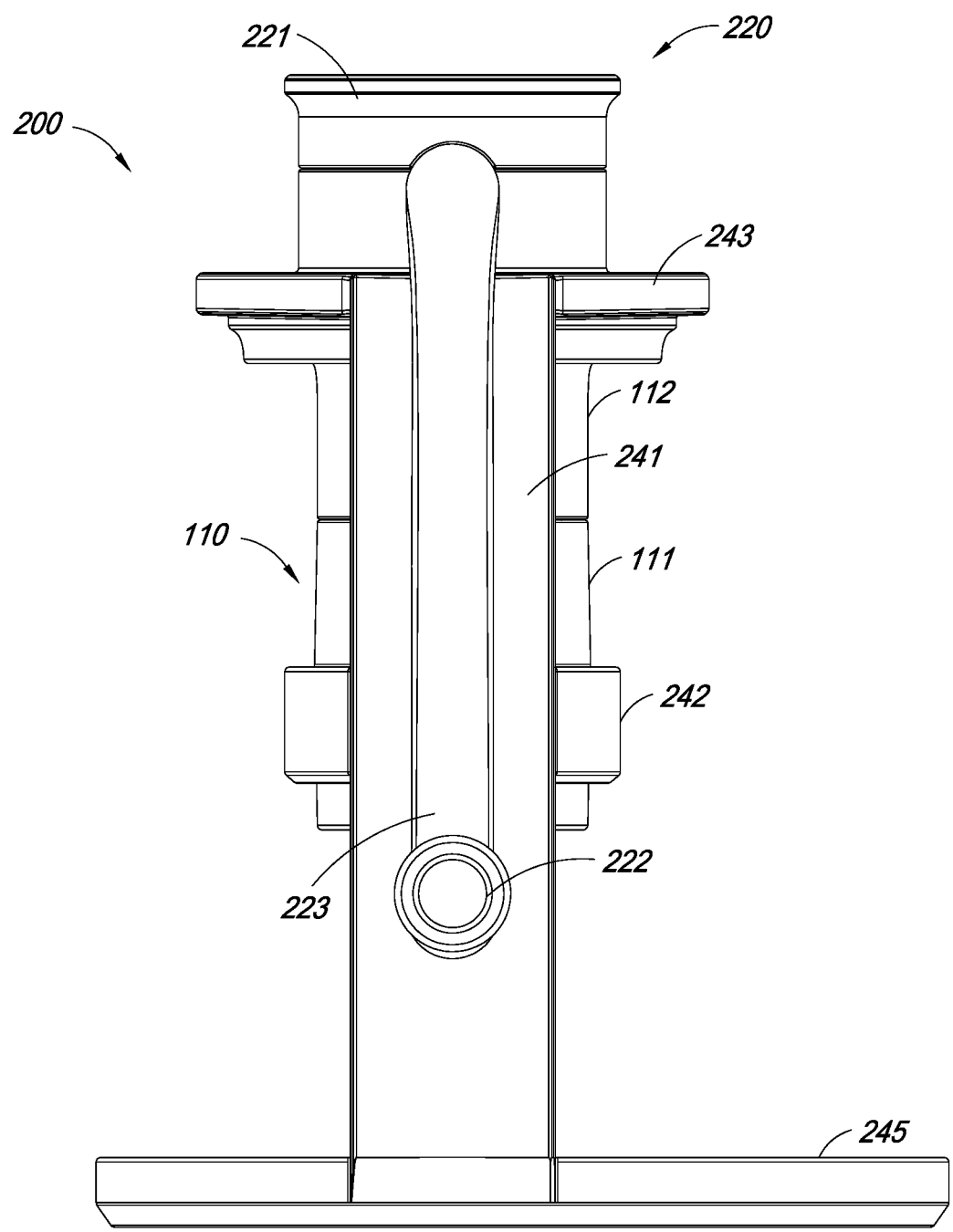
FIG. 3E is a first side view of the grinder of FIG. 3A.
Figure 3F:
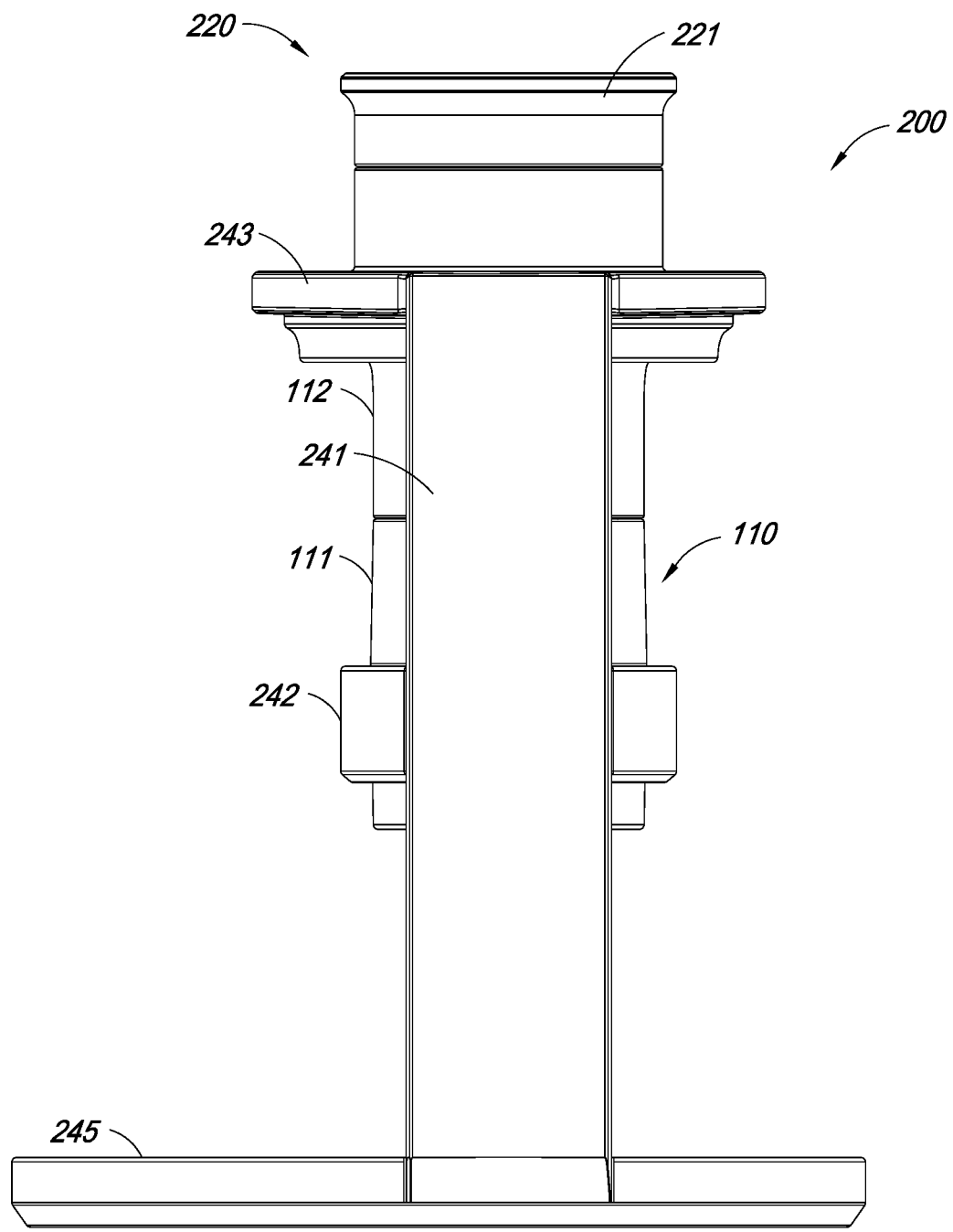
FIG. 3F is a second side view of the grinder of FIG. 3A.
Figure 3G:
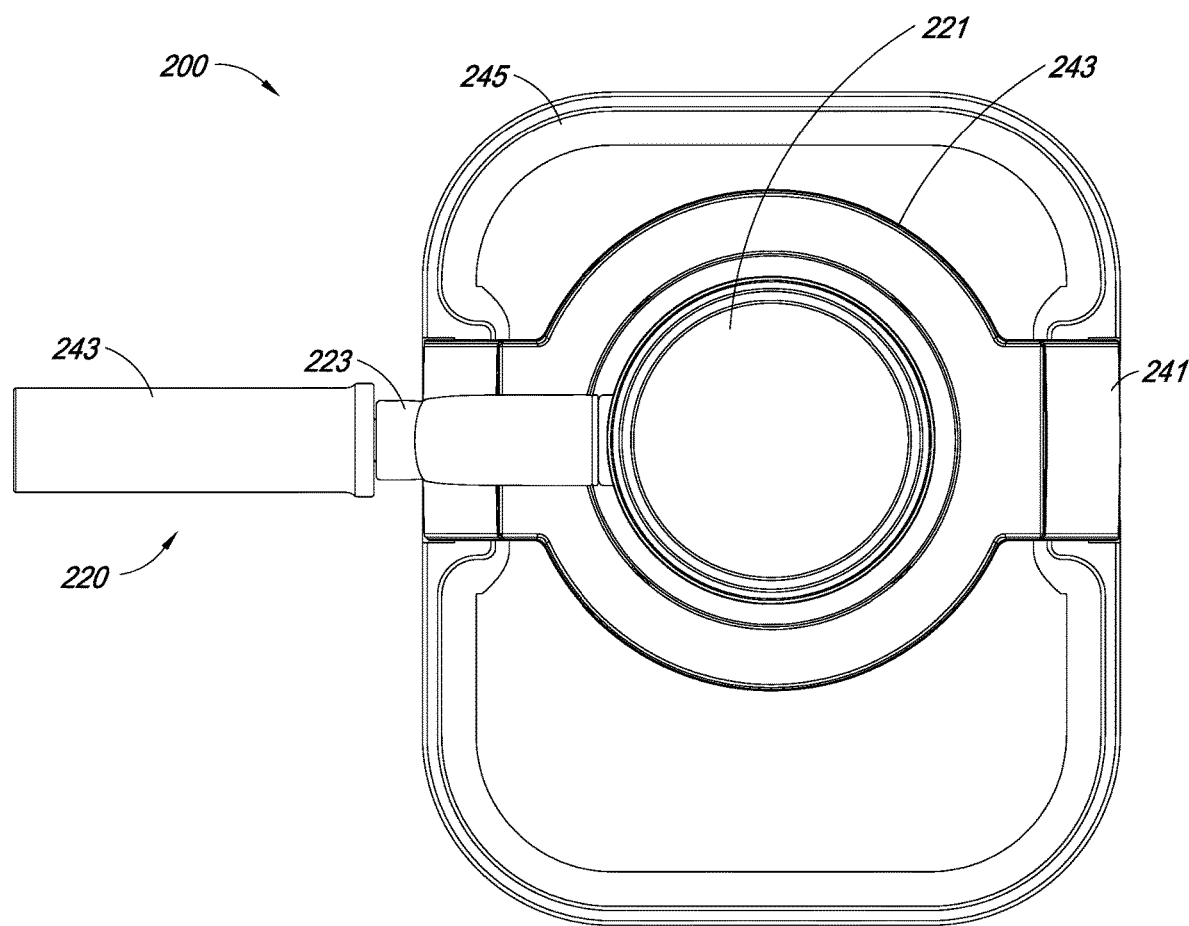
FIG. 3G is a top view of the grinder of FIG. 3A.
Figure 3H:
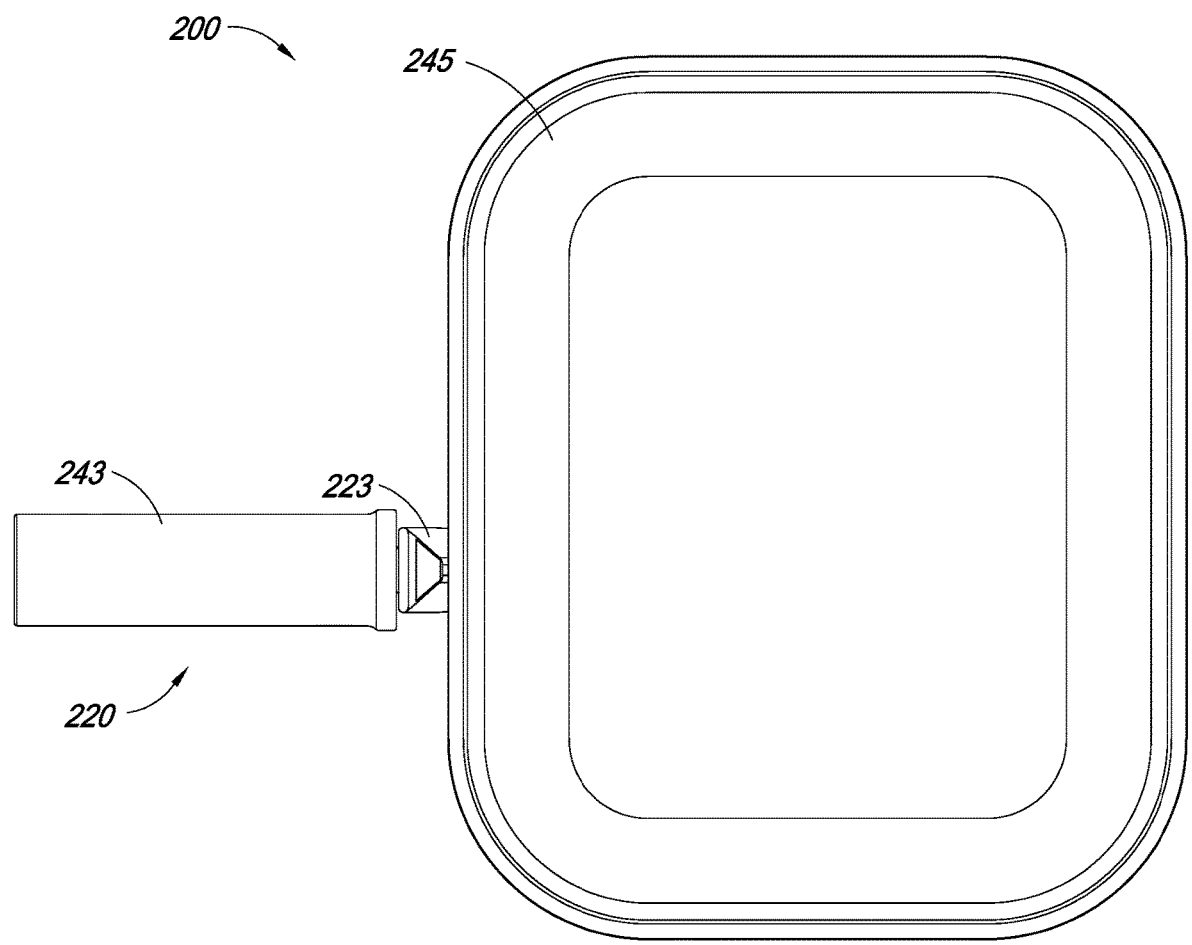
FIG. 3H is a bottom view of the grinder of FIG. 3A.

FIG. 3A shows a perspective view of the grinder system in a second configuration forming a grinder 200. In some embodiments, the configuration of the grinder 200 can be a table-top configuration. FIG. 3B shows an exploded view of the grinder 200. FIG. 3C shows a front view of the grinder 200. FIG. 3D shows a rear view of the grinder 200. FIG. 3E shows a first side view of the grinder 200. FIG. 3F shows a second side view of the grinder 200. FIG. 3G shows a top view of the grinder 200. FIG. 3H shows a bottom view of the grinder 200.

In some embodiments, the grinder 200 can include the grinding unit 110. In some embodiments, when used with the grinder 200, the grinding unit 110 can include any of the same or similar features and functions as described with respect to the grinder 100. In some embodiments, the grinding unit 110 of the grinder 200 can be the same grinding unit 110 as used in grinder 100. For example, in some embodiments, a grinding unit 110 can be removed from the grinder 100 and assembled into the grinder 200 and/or removed from the grinder 200 and assembled into the grinder 100. In this way, a user can transform the modular coffee grinder from a portable configuration into a table-top configuration or vice versa. For example, when returning from work or a travel where a portable configuration may be more suitable, the user can transform the modular coffee grinder into a table-top configuration in a home.

In some embodiments, grinder 200 can include a handle unit 220. In some embodiments, the handle unit 220 can include any of the same features of functions as the handle unit 120. In some embodiments, the handle unit 220 can be configured to attach to the grinding unit 110. In some embodiments, the handle unit 220 can be the same handle unit 120 as in the grinder 100.

In some embodiments, the grinder 200 can include a receptacle. In some embodiments, the receptacle of the grinder 200 can include any of the same or similar features or functions as the receptacle 130. In some embodiments, the receptacle of the grinder 200 can be the same receptacle 130 as in the grinder 100.

In some embodiments, the grinder 200 can include a frame 240. In some embodiments, the frame 240 can be configured to receive the grinding unit 110. In some embodiments, the frame 240 can be configured to hold and/or support the grinding unit 110. In some embodiments, the frame 240 can be configured to hold and/or support the handle unit 220 and/or a receptacle.

The support frame 240 can include one or more arms 241. In some embodiments, the arms 241 can extend vertically or substantially vertically from a top portion of the support frame 240 to a bottom portion of the support frame 240.

In some embodiments, the support frame 240 can include a cradle 243. In some embodiments, the cradle 243 can be disposed on a portion of the support frame 240. In some embodiments, the cradle 243 can extend between and/or attach to two or more arms 241. In some embodiments, the cradle 243 can include an opening, which can be sized, shaped, and/or otherwise configured to allow one or more components of the grinder 200 to extend through the opening. The cradle 243 can be sized, shaped, and/or otherwise configured to receive and and/or support the handle unit 220.

In some embodiments, the support frame 240 can include a cradle 242. In some embodiments, the cradle 242 can extend between and/or attach to two or more arms 241. In some embodiments, the cradle 242 can include an opening, which can be sized, shaped, and/or otherwise configured to allow one or more components of the grinder 200 to extend through the opening. The cradle 242 can sized, shaped, and/or otherwise configured to receive and/or support the grinding unit 110.

In some embodiments, the cradle 242 can include a coupling feature 207. The coupling feature 207 can be configured to couple with the grinding unit 110 to align and/or secure the grinding unit 100 within the cradle 242. In some embodiments, the coupling feature 207 can be a slot, recess, or opening. In some embodiments, the coupling feature 207 can be configured to engage a protrusion or projection of the grinding unit 110 to align and/or secure the grinding unit 110 within the cradle 242. In some embodiments, the coupling feature 207 can be configured to engage the coupling feature 107 of the grinding unit 110 to align and/or secure the grinding unit 110 within the cradle 242.

In some embodiments, the support frame 240 can include one or more locks or locking mechanisms 244. In some embodiments, at least one locking mechanism 244 can be disposed on or within the support frame 240. In some embodiments, the locking mechanism 244 can configured to connect to the grinding unit 110 when the grinding unit 110 is resting in the cradle 242. For example, in some embodiments, the locking mechanism 244 can include a protrusion or projection that can be selectively inserted into and removed from a recess, opening or slot of the grinding unit 110. In some embodiments, the protrusion or projection can be moved into and out of engagement with the grinding unit 110 via a slider, dial, switch, button, lever, trigger, or any other suitable mechanism. In some embodiments, the locking mechanism 244 can include a protrusion or projection that can be selectively inserted into and removed from the coupling feature 109 of the grinding unit 110. In some embodiments, the locking mechanism 244 can be configured to releasably secure the grinding unit 110 within the cradle 242. The locking mechanism 244 can connect to the grinding unit 110 to stabilize the grinding unit 110 relative to the cradle 242. In some embodiments, the locking mechanism 244 can inhibit rotation of the grinding unit 110 relative to the cradle 242. In some embodiments, the locking mechanism 244 can inhibit vertical movement of the grinding unit 110 relative to the cradle 242. In some embodiments, the locking mechanism 244 can inhibit relative disassociation of the grinding unit 110 from the cradle 242.

In some embodiments, the support frame 240 can include a base 245. In some embodiments, the base 245 can include a substantially flat surface. In some embodiments, the base 245 can be attached to the one or more arms 241. In some embodiments, the arms 241 can extend between the base 245 and the cradle 242. In some embodiments, the base 245 can be configured receive and/or support a receptacle or some other cup or container for receiving a product produced by the grinding unit 110.

In some embodiments, the handle unit 220 can be different in structure, shape, size, and/or function from the handle 120. In some embodiments, the handle unit 220 can include an arm 223. In some embodiments, the arm 223 can include any of the same similar features and functions as the arm 123. In some embodiments, the handle unit 220 can include a knob 222. In some embodiments, the knob 222 can include any of the same similar features and functions as the knob 122. In some embodiments, the handle unit 220 can include a transmission component 224. In some embodiments, the transmission component 224 can include any of the same similar features and functions as the transmission component 224.

In some embodiments, the transmission component 224 can be configured to couple to the cradle 243. In some embodiments, the transmission component 224 can rest on top of the cradle 243. In some embodiments, a body of the transmission component 224 and the cradle 243 can include one or more complementary features to releasably secure the transmission component 224 within the cradle 243. In some embodiments, the transmission component 224 can be releasably secured to the cradle 243 so as to prevent rotation and/or movement of the transmission component 224 relative to the cradle 243. For example, in some embodiments, the transmission component 224 may include geometrical features or protrusions which fit into holes, recesses, slots, or grooves in the cradle 243 such that the transmission component 224 is inhibited from rotating relative to the cradle 243. In some embodiments, the transmission component 224 can include a portion which projects through the opening in the cradle 243 and couples to the drive shaft 116. In some embodiments, the cradle 243 can include an intermediary component which couples to both the transmission component 224 and the drive shaft 116 in order to facilitate the transmission of the rotation of the transmission component 224 into rotation of the drive shaft 116.

As shown in FIGS. 3A and 3B, in some embodiments, the handle knob 222 and/or arm 223 can rotate about the grinder 200 vertically. In some embodiments, the handle 220 can rotate about an axis. In some embodiments, the handle 220 can rotate about an axis that is perpendicular or generally perpendicular to a longitudinal axis of the drive shaft 116. In some embodiments, the handle 220 can rotate about an axis that is perpendicular or generally perpendicular to the axis of rotation of the handle 120. In some embodiments, the handle 220 can rotate in a windmill style where the knob 222 and/or arm 223 maintain the same or substantially the same horizontal position relative to the grinding unit 220 during rotation. In operation, the handle knob 222 and/or arm 223 will move forwards and backwards and up and down in the view shown in FIGS. 3C and 3D.

In operation, a user can place an input material, such as coffee beans, in the grinding unit 110 via the handle opening 115. In some embodiments, after an input material is placed in the grinding unit 110, a user can place the grinding unit 110 into the cradle 242. In some embodiments, while the grinding unit 110 is positioned in the cradle 242, the user can secure the grinding unit 110 in place in the cradle 242 via the locking mechanism 244. In some embodiments, while the grinding unit 110 is positioned within the cradle 242, a user can place the handle unit 220 in the 243 to connect the handle unit 220 to the grinding unit 110. In some embodiments, a user can move the handle unit 220 into a locked position within the cradle 243 in which the handle unit 220 is inhibited from rotation relative to the cradle 243. In some embodiments, a user can place a receptacle on the base 245 directly underneath the opening in the bottom of the grinding unit 110. In some embodiments, the user can then grip the handle knob 222 with one hand and can optionally grip the support frame 240 with the other hand for stability. The user can then turn the handle knob 222 and/or arm 223 to cause the blades and/or teeth 213 to grind the input materials into a finer product. In some embodiments, the ground product can fall out of the bottom of the grinding unit 110 into a receptacle or another surface/container positioned beneath the grinding unit 110.

In some embodiments, the grinder 200 can be disassembled by removing the handle unit 220, grinding unit 110, and/or a receptacle from the support frame 240. In some embodiments, disassembly of the grinder 200 facilitates easier storage or transportation of the grinder 200. In some embodiments, disassembly can facilitate easier cleaning and/or maintenance of the grinder 200.

In some embodiments, the grinder 200 may provide a desirable aesthetic appearance for a user. In some embodiments, the grinder 200 may be designed to provide an aesthetically-pleasing "table-top" design.

In some embodiments, the grinder 200 can provide for additional stability relative to the grinder 100 when positioned on a surface. Additionally, in some embodiments, users may prefer to store their modular grinder system as a grinder 200 in comparison to the grinder 100 due to the way it accents the room it is in or compliments other objects in the room in which it is stored.

The grinder 200 can provide flexibility and versatility for a user due to its modular design. In some embodiments, the user has to option to mix and match by choosing from multiple of the same components or multiple different components to use with the grinder 200. In some embodiments, the grinding unit 110 can be configured to couple to a plurality of handle units 220 having different shapes, sizes, and/or designs. In some embodiments, the user can customize the grinder 200 by purchasing or fabricating different handle units 220 and then attaching those handle units 220 to the grinding unit 110. For example, in some embodiments, a user may prefer to use a handle unit 220 which rotates in a helicopter fashion similar to the handle unit 120 of the grinder 100. In some embodiments, a user can attach the handle unit 120 to the cradle 243. In some embodiments, the support frame 240 can receive a plurality of handle units 220 having different shapes, sizes, and/or designs.

The grinding unit 110 can be coupled to a plurality of receptacles having different shapes, sizes, and/or designs. In some embodiments, the support frame 240 can receive a plurality of receptacles having different shapes, sizes, and/or designs.

The grinding unit 110 can be coupled to a plurality of different support frames 240 having different shapes, sizes, and/or designs.

The grinder 200 can be configured to receive one or more attachments. For example, in some embodiments, the grinder 200 is capable of receiving a brewing unit disposed on the base 245 underneath the grinding unit 110. In some embodiments, the brewing unit can be disposed on the base 245 so that a user can produce coffee grounds which fall directly into the compact brewing unit, and the compact brewing unit can produce coffee without the need for a separate coffee machine or press.

Figure 4:
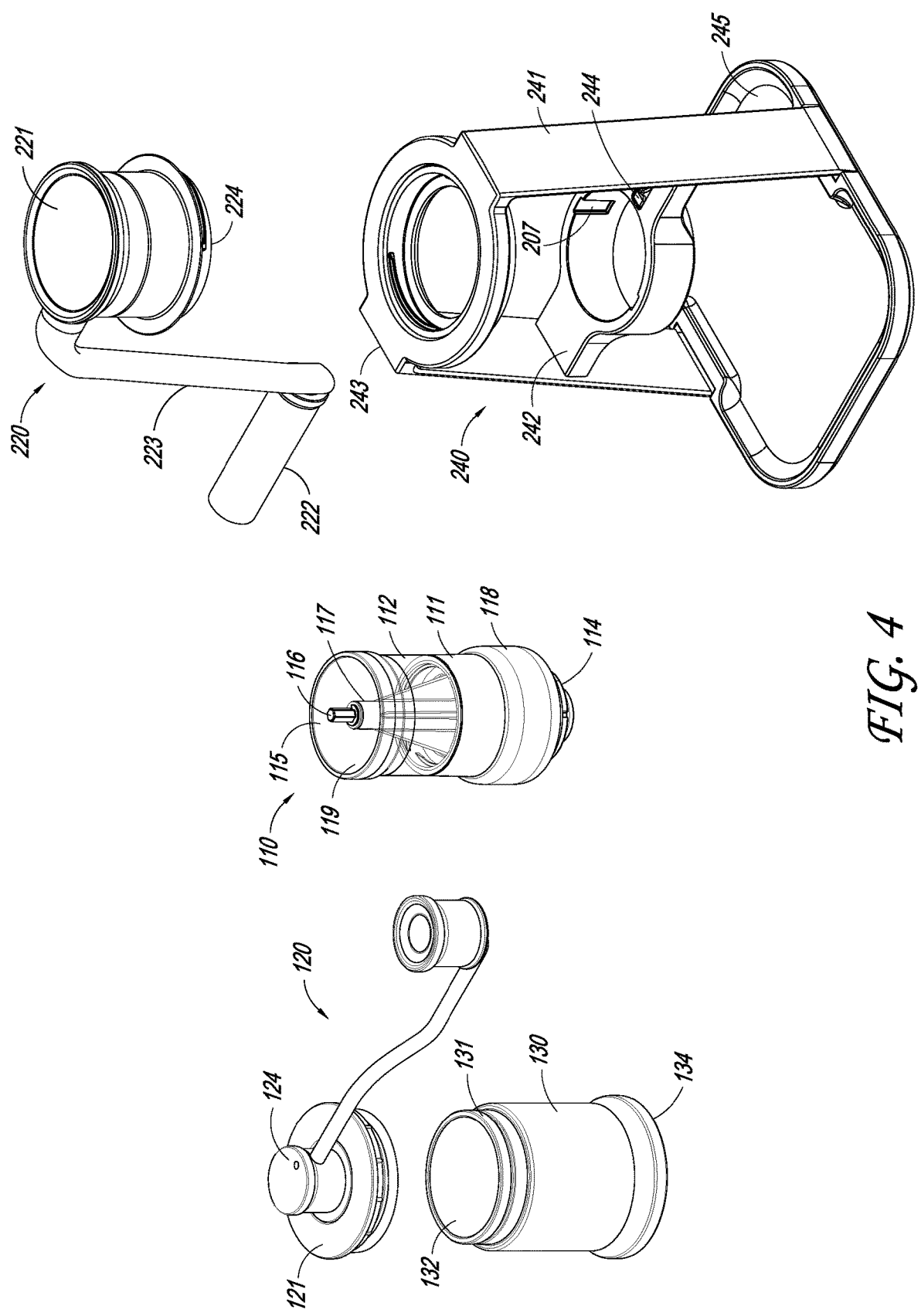
FIG. 4 is a perspective view of an embodiment of a grinding kit.

In some embodiments, some or all of the components of the grinder 100 and the grinder 200 can be manufactured, packaged, sold, distributed, or otherwise combined together as a kit or grinder system. An example of a grinding kit or grinding system 300 is shown in FIG. 4. As shown in FIG. 4, in some embodiments, the grinding kit or grinding system 300 can include the grinding unit 110, the handle unit 120, and the handle unit 220. In some embodiments, the grinding kit or grinding system 300 can include the receptacle 130. In some embodiments, the grinding kit or grinding system 300 can include the frame 240.

As described herein, in some embodiments, a single grinding unit 110 can be used in both the grinder 100 and the grinder 200. In some embodiments, the grinder 100 can be disassembled, and the grinding unit 110 can be used to assemble the grinder 200. In some embodiments, the grinder 200 can be disassembled, and the grinding unit 110 can be used to assemble the grinder 100.

In some embodiments, the same receptacle 130 can be used in both the grinder 100 and the grinder 200. In some embodiments, the grinder 100 can be disassembled, and the receptacle 130 can be used to assemble the grinder 200. In some embodiments, the grinder 200 can be disassembled, and the receptacle 130 can be used to assemble the grinder 100.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the disclosed device. As will be recognized, the presently disclosed device may be embodied within a form that does not provide all of the features and benefits set forth herein, as some features may be used or practiced separately from others. The scope of the disclosure is indicated by the appended claims rather than by the foregoing description. All changes which come within the meaning and range of equivalency of the claims are to be embraced within their scope.

What is claimed is:

1. A grinding kit comprising:
    a grinding unit comprising:
        a body defining an inner cavity, the body comprising a receiving end and a depositing end;
        a plurality of grinding surfaces disposed within the inner cavity of the body; and
        a drive shaft coupled to the one or more grinding surfaces;
    a first handle configured to removably couple to the drive shaft, wherein the first handle is configured to rotate about a first axis of rotation while coupled to the drive shaft to drive movement of the plurality of grinding surfaces; and
    a second handle configured to removably couple to the drive shaft, wherein the second handle is configured to rotate about a second axis of rotation while coupled to the drive shaft to drive movement of the plurality of driving surfaces, the second axis of rotation being different from the first axis of rotation.

2. The grinding kit of claim 1, wherein the first axis is parallel to a longitudinal axis of the drive shaft while the first handle is coupled to the drive shaft.

3. The grinding kit of claim 1, wherein the second axis is perpendicular to a longitudinal axis of the drive shaft while the second handle is coupled to the drive shaft.

4. The grinding kit of claim 1, further comprising a receptacle configured to couple to the depositing end of the grinding unit.

5. The grinding kit of claim 4, wherein the receptacle comprises
    a proximal end coupled to the depositing end of the body of the grinding unit, the proximal end comprising an opening positioned to receive a ground product from the grinding unit;
    a closed distal end; and
    an inner cavity extending between the proximal end and the closed distal end.

6. The grinding kit of claim 1, wherein the grinding unit comprises an input coupled to the plurality of grinding surfaces, the input being manipulable to change relative positions of the plurality of grinding surfaces.

7. The grinding kit of claim 1, wherein the plurality of grinding surfaces comprise a plurality of blades or teeth.

8. The grinding kit of claim 1, further comprising:
a frame comprising:
a base;
a plurality of struts extending superiorly from the base; and
a cradle extending between the plurality of struts and configured to receive the grinding unit.

9. The grinding unit of claim 8, wherein the cradle is a first cradle, wherein the frame comprises a second cradle extending between the plurality of struts and configured to receive the second handle.

10. A portable grinding system comprising:
a grinding unit comprising:
a body defining an inner cavity, the body comprising a receiving end and a depositing end;
a plurality of grinding surfaces disposed within the inner cavity of the body; and
a drive shaft coupled to the one or more grinding surfaces;
a receptacle comprising:
a proximal end coupled to the depositing end of the body of the grinding unit, the proximal end comprising an opening positioned to receive a ground product from the grinding unit;
a closed distal end; and
an inner cavity extending between the proximal end and the closed distal end; and
a first handle removably secured to the receiving end of the grinding unit, the first handle comprising:
a transmission coupled to the drive shaft of the grinding unit; and
a handle arm coupled to the transmission and configured to rotate to drive movement of the plurality of grinding surfaces;
wherein the grinding unit is removable from the receptacle and the first handle and configured to couple to a frame and a second handle to form a table-top grinding system.

11. The grinding system of claim 10, further comprising an input coupled to the plurality of grinding surfaces, the input being manipulable to change relative positions of the plurality of grinding surfaces.

12. The grinding system of claim 10, further comprising a band removably disposed on an outer face of the body of the grinding unit and having one or more surface features configured to facilitate gripping of the band.

13. The grinding system of claim 10, wherein the plurality of grinding surfaces comprise a plurality of blades or teeth.

14. The grinding system of claim 10, wherein the first handle is configured to rotate about an axis parallel to a longitudinal axis of the drive shaft while the first handle is coupled to the drive shaft.

15. A table-top grinding system comprising:
a grinding unit comprising:
a body defining an inner cavity, the body comprising a receiving end and a depositing end;
a plurality of grinding surfaces disposed within the inner cavity of the body; and
a drive shaft coupled to the one or more grinding surfaces;
a frame comprising:
a base;
a plurality of struts extending superiorly from the base; and
a cradle extending between the plurality of struts and configured to secure the grinding unit; and
a first handle removably secured to the receiving end of the grinding unit, the first handle comprising:
a transmission coupled to the drive shaft of the grinding unit; and
a handle arm coupled to the transmission and configured to rotate to drive movement of the plurality of grinding surfaces;
wherein the grinding unit is removable from the first handle and configured to couple to a receptacle and a second handle to form a portable grinding system.

16. The grinding system of claim 15, wherein the cradle is a first cradle, wherein the frame comprises a second cradle extending between the plurality of struts and configured to receive the second handle.

17. The grinding system of claim 15, wherein the cradle comprises a lock configured to inhibit rotation of the grinding unit relative to the cradle.

18. The grinding system of claim 15, wherein the cradle comprises a lock configured to inhibit relative disassociation of the grinding unit from the cradle.

19. The grinding system of claim 15, further comprising a receptacle comprising:
a proximal end comprising an opening positioned to receive a ground product from the grinding unit;
a closed distal end; and
an inner cavity extending between the proximal end and the closed distal end.

20. The grinding system of claim 15, wherein the first handle is configured to rotate about an axis perpendicular to a longitudinal axis of the drive shaft while the first handle is coupled to the drive shaft.

* * * * *